United States Patent
Lavian et al.

(10) Patent No.: US 9,083,728 B1
(45) Date of Patent: Jul. 14, 2015

(54) SYSTEMS AND METHODS TO SUPPORT SHARING AND EXCHANGING IN A NETWORK

(75) Inventors: Tal Lavian, Sunnyvale, CA (US); Zvi Or-Bach, San Jose, CA (US)

(73) Assignees: Tal Lavian, Sunnyvale, CA (US); Zvi Or-Bach, San Jose, CA (US)

( * ) Notice: Subject to any disclaimer, the term of this patent is extended or adjusted under 35 U.S.C. 154(b) by 588 days.

(21) Appl. No.: 13/412,619

(22) Filed: Mar. 6, 2012

(51) Int. Cl.
 *G06F 15/16* (2006.01)
 *H04L 29/08* (2006.01)
 *H04L 29/06* (2006.01)

(52) U.S. Cl.
 CPC ............... *H04L 67/14* (2013.01); *H04L 67/38* (2013.01)

(58) Field of Classification Search
 CPC ....... H04L 67/306; H04L 67/14; H04L 67/38; G06F 15/16
 USPC .................................................. 709/206, 207
 See application file for complete search history.

(56) References Cited

U.S. PATENT DOCUMENTS

| | | | |
|---|---|---|---|
| 5,086,394 A | 2/1992 | Shapira | |
| 5,164,897 A | 11/1992 | Clark et al. | |
| 5,963,951 A | 10/1999 | Collins | |
| 6,026,079 A | 2/2000 | Perlman | |
| 6,061,681 A | 5/2000 | Collins | |
| 6,343,317 B1 | 1/2002 | Glorikian | |
| 6,539,232 B2 | 3/2003 | Hendrey et al. | |
| 6,542,748 B2 | 4/2003 | Hendrey et al. | |
| 6,542,749 B2 | 4/2003 | Tanaka et al. | |
| 6,542,750 B2 | 4/2003 | Hendrey et al. | |
| 6,618,593 B1 | 9/2003 | Drutman et al. | |
| 6,665,389 B1 | 12/2003 | Haste, III | |
| 6,735,568 B1 | 5/2004 | Buckwalter et al. | |
| 6,925,381 B2 | 8/2005 | Adamczyk | |
| 7,069,308 B2 | 6/2006 | Abrams | |
| 7,080,019 B1 | 7/2006 | Hurzeler | |
| 7,082,364 B2 | 7/2006 | Adamczyk | |

(Continued)

FOREIGN PATENT DOCUMENTS

| | | |
|---|---|---|
| CN | 102202053 A | 9/2011 |
| EP | 2472898 A1 | 7/2012 |

(Continued)

OTHER PUBLICATIONS

Corporate Executive Board, "Leveraging Social Media Networking Sites in Marketing Communications," Marketing Leadership Council, Jan. 2008, Issue Brief, Catalog No. CEB17O0BK9.

(Continued)

*Primary Examiner* — David X Yi

(57) ABSTRACT

Embodiments of the invention provide for providing support for sharing and exchanging in a network. The system includes a memory coupled to a processor. The memory includes a database comprising information corresponding to first users and the second users. Each of the first users and the second users are facilitated for sharing or exchanging activity, service or product, based on one or more conditions corresponding thereto. Further, the memory includes one or more instructions executable by the processor to match each of the first users to at least one of the second users. Furthermore, the instructions may inform each of the first users about the match with the at least one of the second users when all the conditions are met by the at least one second user based on the information corresponding to each of the second users.

12 Claims, 10 Drawing Sheets

(56) References Cited

U.S. PATENT DOCUMENTS

| | | |
|---|---|---|
| 7,085,806 B1 | 8/2006 | Shapira |
| 7,167,910 B2 | 1/2007 | Farnham et al. |
| 7,188,153 B2 | 3/2007 | Lunt et al. |
| 7,203,674 B2 | 4/2007 | Cohen |
| 7,246,067 B2 | 7/2007 | Austin et al. |
| 7,275,068 B2 | 9/2007 | Huberman et al. |
| 7,451,161 B2 | 11/2008 | Zhu et al. |
| 7,472,110 B2 | 12/2008 | Achlioptas |
| 7,478,078 B2 | 1/2009 | Lunt et al. |
| 7,627,422 B2 | 12/2009 | Adamczyk et al. |
| 7,680,770 B1 | 3/2010 | Buyukkokten et al. |
| 7,702,685 B2 | 4/2010 | Shrufi et al. |
| 7,761,386 B2 | 7/2010 | Teicher |
| 7,788,249 B2 | 8/2010 | Rotholtz |
| 7,869,945 B2 | 1/2011 | Huang et al. |
| 7,882,039 B2 | 2/2011 | Weiss et al. |
| 7,885,901 B2 | 2/2011 | Hull et al. |
| 7,911,335 B1 | 3/2011 | Brady, Jr. |
| 7,930,098 B2 | 4/2011 | Huang et al. |
| 7,933,856 B2 | 4/2011 | Verspoor et al. |
| 7,953,673 B2 | 5/2011 | Augusto et al. |
| 7,970,533 B2 | 6/2011 | Huang et al. |
| 7,974,779 B2 | 7/2011 | Huang et al. |
| 8,036,824 B2 | 10/2011 | Huang et al. |
| 8,060,573 B2 | 11/2011 | Leonard |
| 8,066,568 B2 | 11/2011 | O'Kelley, II et al. |
| 8,086,400 B2 | 12/2011 | Huang et al. |
| 8,095,305 B2 | 1/2012 | Huang et al. |
| 8,108,501 B2 | 1/2012 | Birnie et al. |
| 8,117,272 B1 | 2/2012 | Leonard |
| 8,144,007 B2 | 3/2012 | Tuck et al. |
| 8,156,064 B2 | 4/2012 | Brown |
| 8,195,668 B2 | 6/2012 | Drennan et al. |
| 8,224,571 B2 | 7/2012 | Huang et al. |
| 8,234,346 B2 | 7/2012 | Rao et al. |
| 2001/0056363 A1 | 12/2001 | Gantz et al. |
| 2002/0103792 A1 | 8/2002 | Blank et al. |
| 2002/0160339 A1 | 10/2002 | King et al. |
| 2003/0064807 A1 | 4/2003 | Walker et al. |
| 2003/0171148 A1 | 9/2003 | Weitz |
| 2004/0049424 A1 | 3/2004 | Murray et al. |
| 2004/0088325 A1 | 5/2004 | Elder et al. |
| 2004/0122803 A1 | 6/2004 | Dom et al. |
| 2004/0167794 A1 | 8/2004 | Shostack et al. |
| 2004/0249811 A1 | 12/2004 | Shostack et al. |
| 2004/0260781 A1 | 12/2004 | Shostack et al. |
| 2005/0192097 A1 | 9/2005 | Farnham et al. |
| 2005/0201290 A1 | 9/2005 | Vasudev et al. |
| 2005/0267940 A1 | 12/2005 | Galbreath et al. |
| 2006/0041543 A1 | 2/2006 | Achlioptas |
| 2006/0085419 A1 | 4/2006 | Rosen |
| 2006/0106780 A1 | 5/2006 | Dagan |
| 2006/0121990 A1 | 6/2006 | O'Kelley et al. |
| 2006/0135264 A1 | 6/2006 | Shaw et al. |
| 2006/0161599 A1 | 7/2006 | Rosen |
| 2006/0287096 A1 | 12/2006 | O'Kelley et al. |
| 2006/0287099 A1 | 12/2006 | Shaw et al. |
| 2007/0060328 A1 | 3/2007 | Zrike et al. |
| 2007/0173325 A1 | 7/2007 | Shaw et al. |
| 2007/0218980 A1 | 9/2007 | Pachnis et al. |
| 2007/0282621 A1 | 12/2007 | Altman et al. |
| 2008/0005072 A1 | 1/2008 | Meek et al. |
| 2008/0005073 A1 | 1/2008 | Meek et al. |
| 2008/0086319 A1 | 4/2008 | Berger |
| 2008/0091342 A1 | 4/2008 | Assael |
| 2008/0091445 A1 | 4/2008 | Mihic |
| 2008/0147743 A1 | 6/2008 | Taylor et al. |
| 2008/0167892 A1 | 7/2008 | Clark et al. |
| 2008/0172381 A1 | 7/2008 | Suh |
| 2008/0222535 A1 | 9/2008 | Zrike et al. |
| 2008/0277183 A1 | 11/2008 | Huang et al. |
| 2008/0300937 A1 | 12/2008 | Allen et al. |
| 2009/0112827 A1 | 4/2009 | Achlioptas |
| 2009/0125230 A1 | 5/2009 | Sullivan |
| 2009/0138546 A1 | 5/2009 | Cruzada |
| 2009/0234573 A1 | 9/2009 | Notarantonio |
| 2009/0248587 A1 | 10/2009 | Van Buskirk |
| 2009/0307234 A1 | 12/2009 | Zrike et al. |
| 2009/0307314 A1 | 12/2009 | Smith et al. |
| 2009/0319288 A1 | 12/2009 | Slaney et al. |
| 2009/0325709 A1 | 12/2009 | Shi |
| 2010/0063934 A1 | 3/2010 | Khoo |
| 2010/0095009 A1 | 4/2010 | Matuszewski et al. |
| 2010/0114626 A1 | 5/2010 | Piccinini et al. |
| 2010/0145869 A1 | 6/2010 | Brown |
| 2010/0185625 A1 | 7/2010 | Johnson et al. |
| 2010/0223066 A1 | 9/2010 | Berger |
| 2010/0229221 A1 | 9/2010 | Tam et al. |
| 2010/0250643 A1 | 9/2010 | Savage et al. |
| 2010/0262477 A1 | 10/2010 | Hillerbrand et al. |
| 2010/0293476 A1 | 11/2010 | Rosenblum et al. |
| 2010/0306119 A1 | 12/2010 | Banerjee et al. |
| 2010/0319062 A1 | 12/2010 | Danieli et al. |
| 2010/0332242 A1 | 12/2010 | Kamar et al. |
| 2011/0047237 A1 | 2/2011 | Walsh et al. |
| 2011/0054956 A1 | 3/2011 | Meyer et al. |
| 2011/0066664 A1 | 3/2011 | Goldman et al. |
| 2011/0083101 A1 | 4/2011 | Sharon et al. |
| 2011/0093498 A1 | 4/2011 | Lunt et al. |
| 2011/0112717 A1 | 5/2011 | Resner |
| 2011/0112976 A1 | 5/2011 | Ryan et al. |
| 2011/0113113 A1 | 5/2011 | Ryan et al. |
| 2011/0119230 A1 | 5/2011 | Zuber |
| 2011/0131085 A1 | 6/2011 | Wey |
| 2011/0138293 A1 | 6/2011 | Koren |
| 2011/0142016 A1 | 6/2011 | Chatterjee |
| 2011/0145050 A1 | 6/2011 | Gross et al. |
| 2011/0161319 A1 | 6/2011 | Chunilal |
| 2011/0166928 A1 | 7/2011 | Robinson et al. |
| 2011/0179064 A1 | 7/2011 | Russo |
| 2011/0196855 A1 | 8/2011 | Wable et al. |
| 2011/0225293 A1 | 9/2011 | Rathod |
| 2011/0238755 A1 | 9/2011 | Khan et al. |
| 2011/0258303 A1 | 10/2011 | Nath et al. |
| 2011/0314048 A1 | 12/2011 | Ickman et al. |
| 2011/0320375 A1 | 12/2011 | Zrike et al. |
| 2012/0078884 A1 | 3/2012 | Callari et al. |
| 2012/0102064 A1 | 4/2012 | Becker et al. |
| 2012/0109779 A1 | 5/2012 | Shin et al. |
| 2012/0173625 A1 | 7/2012 | Berger |
| 2012/0197724 A1 | 8/2012 | Kendall |
| 2012/0209912 A1 | 8/2012 | Brown |

FOREIGN PATENT DOCUMENTS

| | | |
|---|---|---|
| WO | 03030051 A1 | 4/2003 |
| WO | 2008041173 A2 | 4/2008 |
| WO | 2009023701 A2 | 2/2009 |
| WO | 2009029913 A2 | 3/2009 |
| WO | 2010019792 A2 | 2/2010 |
| WO | 2011081777 A1 | 7/2011 |
| WO | 2011115507 A1 | 9/2011 |
| WO | 2011119859 A2 | 9/2011 |
| WO | 2011160855 A1 | 12/2011 |
| WO | 2011163132 A2 | 12/2011 |
| WO | 2012019646 A2 | 2/2012 |
| WO | 2012021676 A2 | 2/2012 |
| WO | 2012040692 A2 | 3/2012 |
| WO | 2012091735 A2 | 7/2012 |
| WO | 2012095866 A2 | 7/2012 |
| WO | 2012116197 A2 | 8/2012 |

OTHER PUBLICATIONS

Jennifer Mankoff et al., "Leveraging Social Networks to Motivate Individuals to Reduce their Ecological Footprints", HICSS, 2007, HCI Institute, Department of Civil and Environmental Engineering and Heinz School of Public Policy & Management Carnegie Mellon University.

Roel Wessels, "Combining Ridesharing & Social Networks," s0023310, Technical report, 2009.

| User ID 402 | Profile Information 404 | | Announcement / Request 406 | | Average Public Rating 408 | Over-all Profile Points 410 |
|---|---|---|---|---|---|---|
| | Personal Details 418 | Qualification and other info 420 | Activity/ service/ Product 422 | Condition 424 | | |
| User 1 412 | A | Q1 | House Keeping | 6am-7pm | 3 | 25 |
| | L1 | | | Sunday | | |
| | H1 | | | 1 person required | | |
| User 2 414 | B | Q2 | Baby Sitting | 5am-11am | 5 | 9 |
| | L2 | | | Monday | | |
| | H1 | | | 1 Female required | | |
| User 3 416 | C | Q3 | Cricket | 6pm-10pm | 1 | -10 |
| | L3 | | | 22-Feb-2012 | | |
| | H2 | | | 10 Males required | | |

Database 400

Fig-4

Database 500

| User ID 502 | Profile Information 504 | | Announcement / Acceptance 506 | | | Rating or Review 508 | Earned Points (if 5 points for each sharing) 510 |
|---|---|---|---|---|---|---|---|
| | Personal Details 518 | Qualification and other info. 520 | Activity/ service/ Product sharing 522 | Condition 524 | status 526 | | |
| User 1 512 | A | Q1 | Biking Riding | 6-7am Sunday 1 person required | Completed | 5 | +5 |
| | L1 | | | | | | |
| | H1 | | | | | | |
| User 2 514 | B | Q2 | — | — | Accepted | 4 | -5 |
| | L2 | | | | | | |
| | H1 | | | | | | |
| User 3 516 | C | Q3 | Kid Care | Between 8am to 7pm | Pending | — | 0 |
| | L3 | | | | | | |
| | H2 | | | | | | |

Fig-5

Database 600

| User ID 602 | Profile Information 622 | | Announcement / Acceptance 606 | | | Activity Specific Rating (given to the second user) | Accepter IDs 608 610 |
|---|---|---|---|---|---|---|---|
| | Personal Details 618 | Qualification and other info. 620 | Activity/ service/ Product sharing 622 | Condition 624 | status 626 | | |
| User 1 612 | A<br>L1<br>H1 | Q1 | House Keeping | 6am-7pm<br>Sunday<br>1 person required | Completed | 5 | User 2 |
| User 2 614 | B<br>L2<br>H1 | Q2 | Baby Sitting | 5am-11am<br>Monday<br>1 Female required | Accepted | — | User 1<br>628 |
| User 3 616 | C<br>L3<br>H2 | Q3 | Cricket | 6pm-10pm<br>22-Feb-2012<br>10 Males required | Pending | —<br>630 | —<br>632 |

Fig-6

SYSTEMS AND METHODS TO SUPPORT SHARING AND EXCHANGING IN A NETWORK

FIELD OF THE INVENTION

The invention relates to social networking applications and more specifically the invention relates to leveraging social networks by sharing and exchanging activities, services and resources.

BACKGROUND OF THE INVENTION

In current scenario of global inflation, resource management is increasingly required to cut the cost and to overcome many other problems. For example, the prevalent use of single occupancy vehicles is known to be a significant cause of several major economic, social and environmental problems. The problems embrace increasing cost due to usage of energy resource for each vehicle, higher parking-space issues, traffic congestion, increased level of air pollution and the like. Further, an alternative to the usage of single occupancy vehicles is the use of multi-occupancy vehicles, where multiple individuals can share a single vehicle.

For sharing a resource such as a vehicle, an individual needs to search for people who are willing to join for sharing a vehicle for riding together to a particular location. This requires spending time in searching reliable people to share the ride. Further, in existing systems, a user can post a query for vehicle sharing. Corresponding to the post, other users of the system those are interested in sharing the vehicle for the ride (hereinafter may be referred to as "interested users") can reply to that query regarding their interests in sharing the vehicle. However, in these systems, the interested users may be completely unknown to the user who posts the query. Thus, the main problem in such systems is the lack of credibility, in the interested people, which typically is the pre-requisite for many users. Further, in these systems, the user has to wait until any interested user respond corresponding to the query of the user. Furthermore, the user may need to contact the other interested users, either personally or telephonically, to discuss various parameters for sharing the vehicle. Such parameters may include, but are not restricted to, compensation/expense that may be shared between the users, timings, and various conditions corresponding to the sharing of vehicle for a ride. This wastes a significant amount of time on the user's part.

Further, in addition to vehicle sharing, there are some other resources that may not be shared, generally, with others such as house, machinery etc. Further, such non-sharable resources may be expensive to possess. An individual may think of providing or receiving such resource in exchange of any other resource or any service. However, exchanging such expensive resources, with any other resource or service offered by any other person, require a high level of credibility in the offer of the other person and vice versa. Further, if an individual decides to exchange a resource with a service offered by the other person then the individual may be required to keep an eye on the activities performed (corresponding to the service) by the other person. This wastes a significant time of the individual to track the service provided by the other person. For example, a user may think of reducing a cost by borrowing a machinery from any other person (possessing the machinery) in exchange of providing some service to the other person such as pets' keeping in the absence of the other person. Here, the other person has to have trust on the individual so as to allow the individual to handle the pets in the absence of the other person. Thus, credibility of any unknown users for exchanging the product/service remains always under stake.

In addition to resource sharing and exchanging, many individuals like to look for people for some collective activities, such as recreational activities. For any recreational activity, such as playing, riding etc., an individual usually searches for like-minded people. For example, an individual may be willing to go out to dine with someone or may be willing to play chess with someone who is good at (or interested in) playing chess. For this, the individual may be required to spend a considerable amount of time to search any person around who is like-minded and also credible to go along with for any such collective activity. In such cases, credibility of any unknown person is always a question for the individual.

Based on the aforementioned, there is a need of a system and a corresponding method to support resource sharing with credible users and without requiring much time consumption at a user's end. Further, the system should provide support for combined or exchangeable activities with credible and suitable users based on the interest of a user. Furthermore, the system should support a user for sharing and/or exchanging services or products. Thus, the system is required for providing support to a user in sharing/exchanging resources/services and to overcome the shortcoming of the related arts.

SUMMARY

Embodiments for the present invention provide a system for sharing and exchanging in a network. The system includes a processor and a memory coupled to the processor. The memory includes a database comprising information corresponding to first users. Each of the first users is facilitated for announcing sharable activity, service or product, and one or more conditions corresponding thereto. The sharable activity, service or product is announced for inviting one or more second users therefor. Further, the database includes information corresponding to the one or more second users. The second users are facilitated for accepting at least one of the announced sharable activity, service or product. Further, the memory includes instructions executable by the processor to match each of the first users to at least one of the second users. Furthermore, the memory includes instructions executable by the processor to inform each of the first users about the match with the at least one of the second users. Each of the first users matches with at least one of the second users when all the one or more conditions are met by the at least one second user based on the information corresponding to each of the second users.

Further, embodiments of the present invention provide a system to support sharing and exchanging in a network. The system includes a processor and a memory coupled to the processor. The memory includes a database comprising a list of first users. Each of the first users willing to provide share of at least one of activity, service or product, and one or more conditions corresponding thereto. Further, the database includes a list of second users. The second users are facilitated to accept the share of activity, service or product. Further, the memory includes instructions executable by the processor to match each of the first users to at least one of the second users. Each of the first users matches with at least one of the second users when the one or more conditions are met by information corresponding to the at least one of the second users. Furthermore, the memory includes instructions executable by the processor to send an email to the first user for credit of pre-set number of points. Additionally, the memory includes instructions executable by the processor to send an email to the at least one of the second users for debit of the pre-set number of points.

Furthermore, embodiments of the present invention provide a system to support sharing and exchanging in a network. The system includes a processor and a memory coupled to the processor. The memory includes a database comprising list of first users. Each of the first users willing to provide share of at least one of activity, service or product, and one or more conditions corresponding thereto. Further, the database includes a list of second users. The second users facilitated to accept the share of activity, service or product. Further, the memory includes instructions executable by the processor to match each of the first users to at least one of the second users. Each of the first users matches with at least one of the second users when the one or more conditions are met by information corresponding to the at least one of the second users. Furthermore, the memory includes instructions executable by the processor to send a notification to the first user to provide review for the at least one of the second user. Additionally, the memory includes instructions executable by the processor to send a notification to the at least one of the second users to provide review for the at least one of the first user.

BRIEF DESCRIPTION OF THE DRAWINGS

Having thus described the invention in general terms, reference will now be made to the accompanying drawings, which are not necessarily drawn to scale, and wherein

Figure 1:
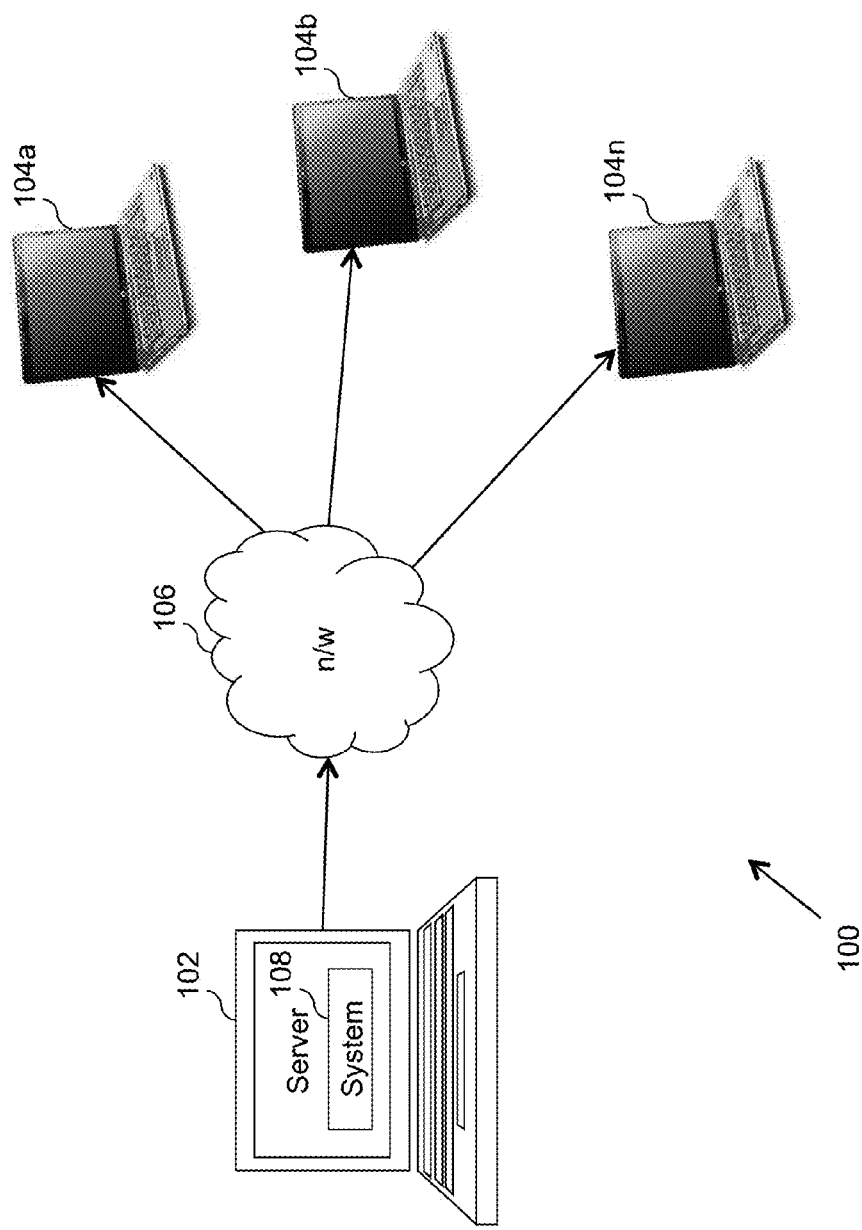
Figure 2:
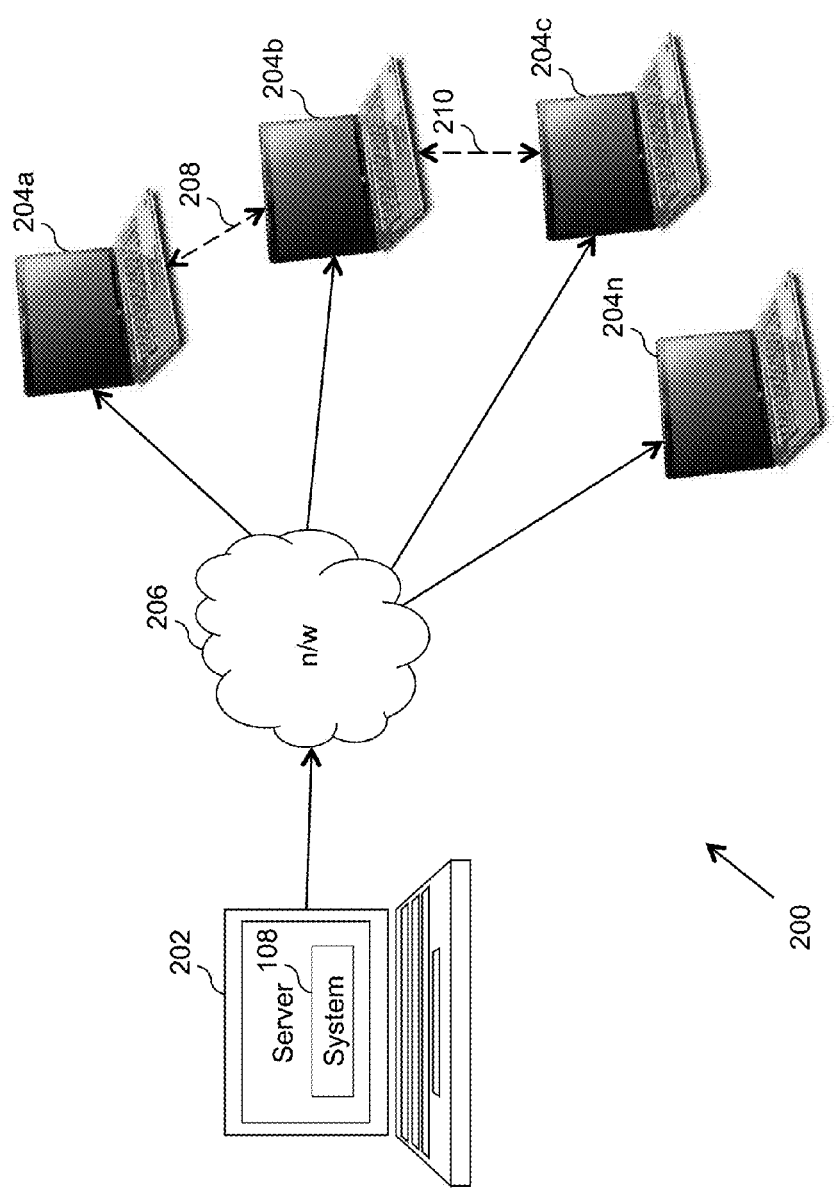
Figure 3:
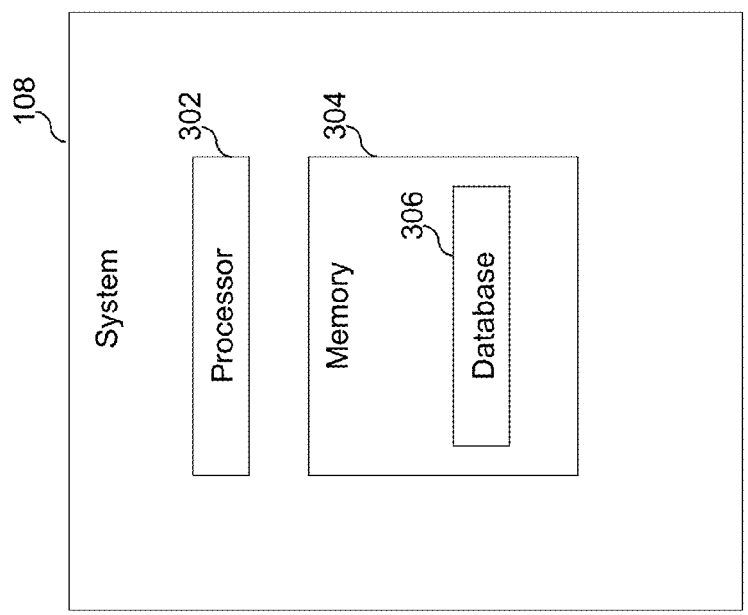
Figure 7A:
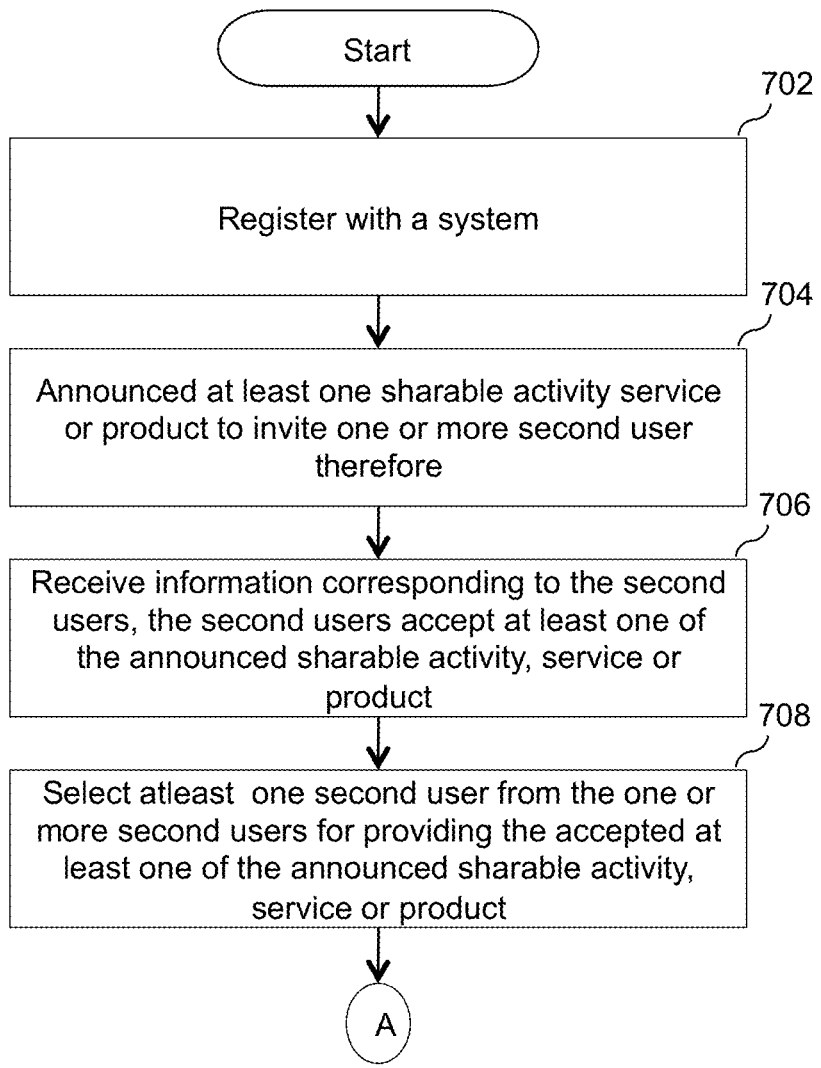
Figure 7B:
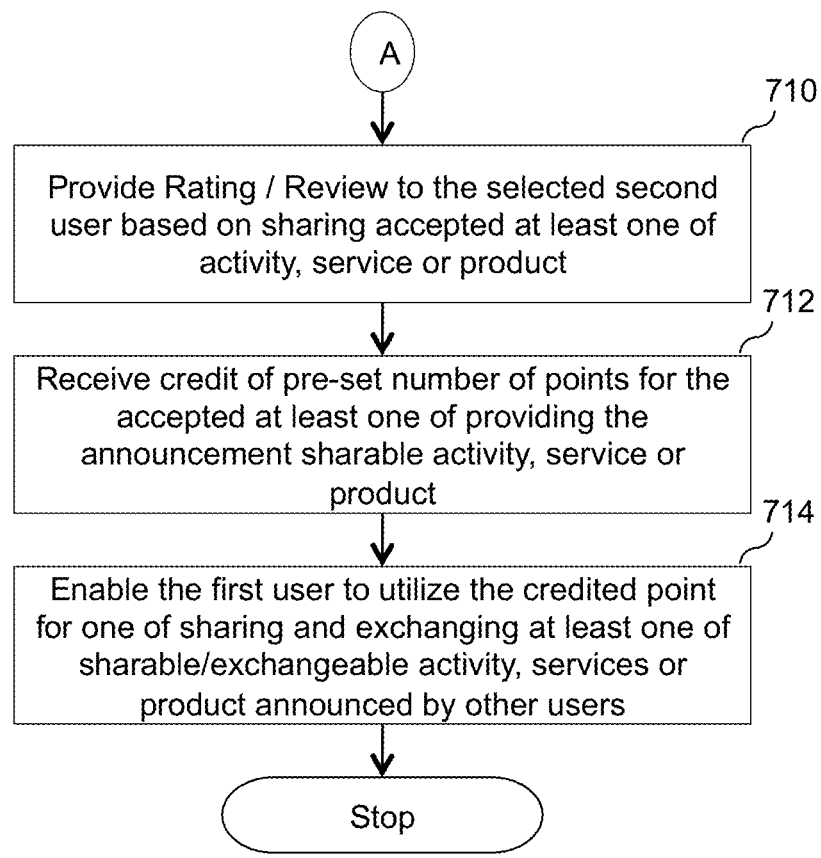
Figure 8:
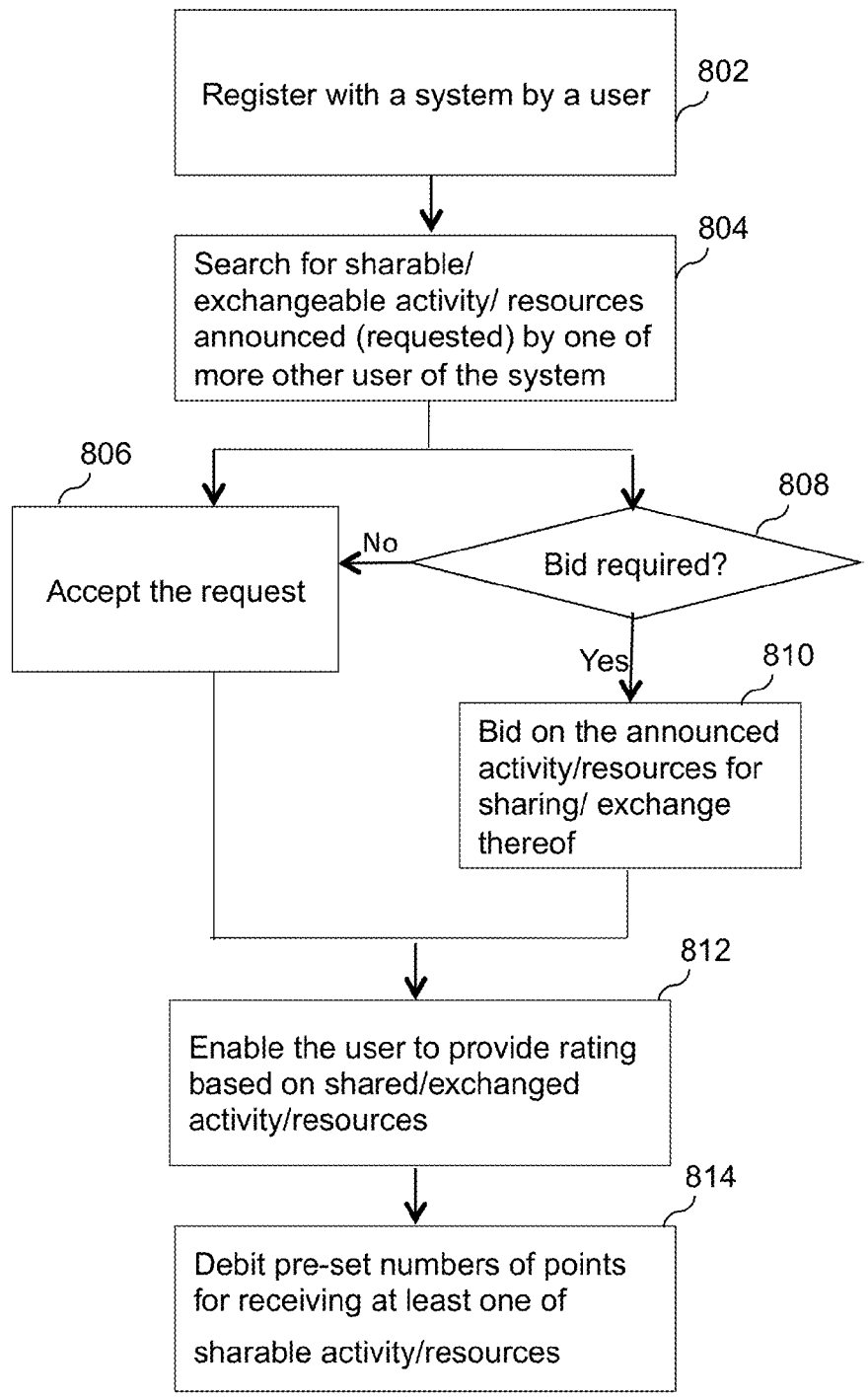
Figure 9:
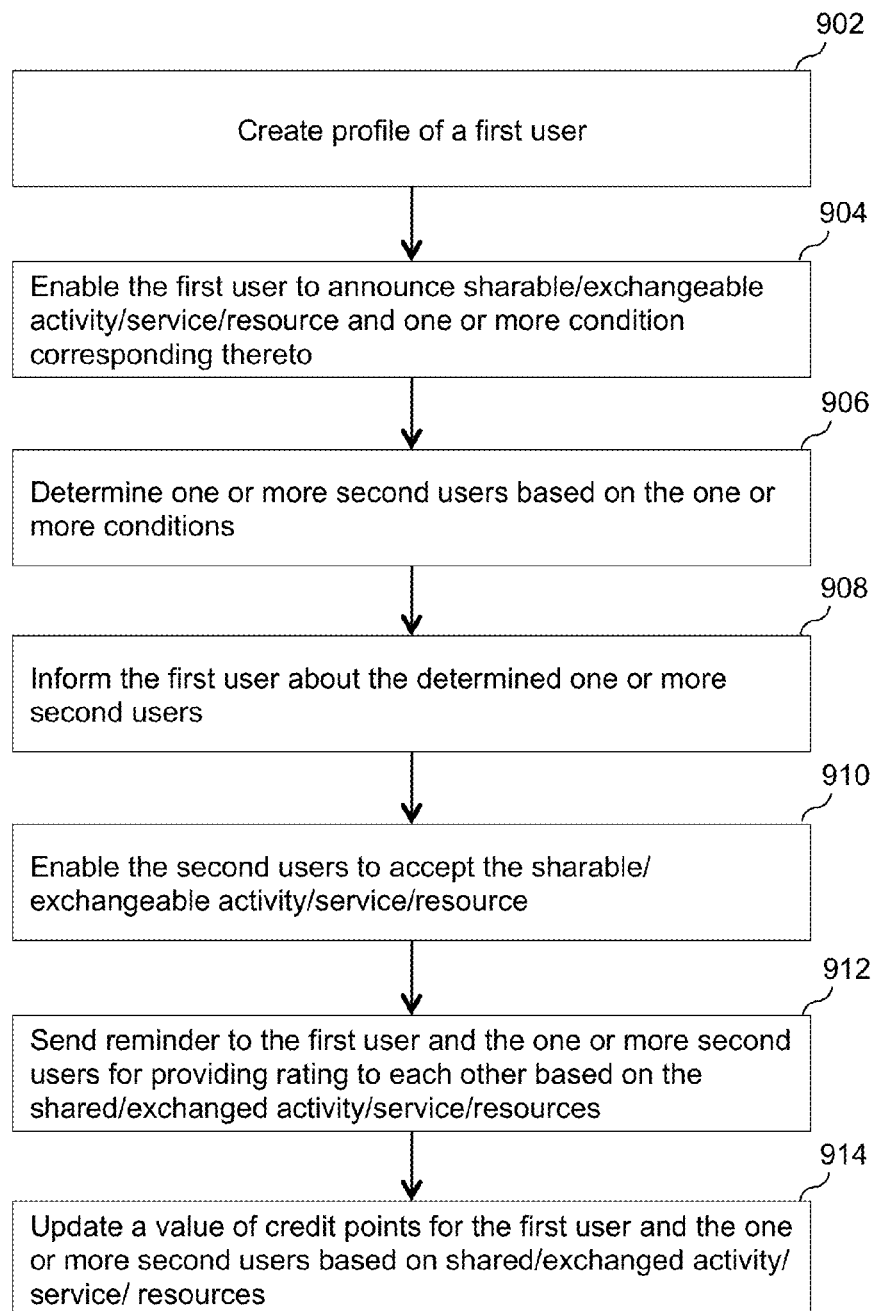

FIG. 1 illustrates an exemplary environment where various embodiments of the present invention are implemented;

FIG. 2 illustrates another exemplary environment where various embodiments of the present invention are implemented;

FIG. 3 illustrates exemplary block diagram of a system to support sharing and exchanging, in accordance with an embodiment of the present invention;

FIG. 4 illustrates exemplary structure of a database for storing information corresponding to users of the system, in accordance with an embodiment of the present invention;

FIG. 5 illustrates exemplary structure of a database for storing information corresponding to users of the system, in accordance with another embodiment of the present invention;

FIG. 6 illustrates exemplary structure of a database for storing information corresponding to users of the system, in accordance with yet another embodiment of the present invention;

FIGS. 7A and 7B illustrate a flow diagram of a method for sharing and exchanging at least one of activity, service and product in a network, in accordance with an embodiment of the present invention;

FIG. 8 illustrates a flow diagram of a method for sharing and exchanging at least one of activity, service and product in a network, in accordance with another embodiment of the present invention; and FIG. 9 illustrates a flow diagram of a method for sharing and exchanging at least one of activity, service and product in a network, in accordance with yet another embodiment of the present invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates an exemplary environment 100 where various embodiments of the present invention are implemented. The environment 100 includes a server 102 connected to a plurality of client devices 104a, 104b . . . 104n via a network 106. The client devices 104a, 104b . . . 104n (hereinafter may collectively be referred to as "client devices 104") may refer to electronic devices that may be utilized by users to access the server 102. Examples of the client devices 104 may include, but are not restricted to, a personal computer, a mobile phone, a smart phone, a personal digital assistant (PDA), a tablet computer, a laptop, and the like. The Network 106 may include, but is not restricted to, a communication network such as Internet, PSTN, Local Area Network (LAN), Wide Area Network (WAN), Metropolitan Area Network (MAN), and so forth. In an embodiment, the network 106 can be a data network such as the Internet. Further, the server 102 may include a system 108 to support sharing and exchange among the users of the client devices 104 (hereinafter referred to as "users"). The system 108 may facilitate the share and exchange of an activity, service or product among the users through the network 106. Further, the messages exchanged between the server 102 and the client devices 104 can comprise any suitable message format and protocol capable of communicating the information necessary for the server 102 to provide a desired service to the client devices 104. In an embodiment of the present invention, the messages comprise hypertext transfer protocol (HTTP) messages.

In an embodiment of the invention, server 102 may be a host for a social networking website that may utilize the system 108 for supporting the users of the social networking website to share and/or exchange various activities and resources, such as vehicles, equipments, services, among themselves. Further, in another embodiment, the social networking may be a part of the system 108 that may require the users to register, therewith, for facilitating the users with various support services of sharing and exchanging in the system of social network. Further, in an embodiment, the users of the client devices 104 may need to register with the system 108 for sharing and exchanging at least one of activity, product, or service (hereinafter 'activity', 'product' and 'service' may collectively be referred to as 'resources') in the network 106. The user may be registered, to create a profile, by submitting information, such as personal information, academic information, professional information and the like, to the system 108. The personal information of a user may include, but is not restricted to, name, location, and hobbies. Further, the academic information of the user may include, but is not restricted to, qualification details and any academic achievement. Similarly, the professional information may include details corresponding to the profession (if any) such as industry, designation and the like, of the user. The information corresponding to the profile of the user is explained further in conjunction with FIG. 4 and FIG. 5.

In an embodiment, each of the registered users may communicate messages to share or exchange the resources with other users. In an embodiment, each user may post communication message through his/her profile for public viewing. Such messages, if posted by the user, may be shown to all other users of the system 108. Further, in another embodiment, the communication between various users of the system 108 may be through sending messages directly to intended users of the system 108. Again further, in another embodiment, the user may define one or more groups of users on various bases such as types of users, relationships with users and the like. For example, groups for friends, relatives and the like. Further, the user may post the request/announcement to a specific group of users. Yet in another embodiment, the users may create particular rooms in their profiles for sharing activity or service with users of the system 108. For example, the user may create a room for sharing of resources such as vehicle, products and the like.

Similarly, the user may create a room for exchange of services between users, such as a room for exchanging services like baby sitting with any product of services offered by other users of the system 108. For example, if a user of the system 108 plans to travel from a first location to a second location, the user may post this information on his/her shared room corresponding to travelling. The information posted by the user may be visible to all other users of the system 108 who share the common room. The system 108 may also notify one or more other users, about the travelling plan of the user, through appropriate means. The one or more users may include, but are not limited to, users of the system 108 who share the common room or having the same interests (as may be determined through the users' profile), for example, but not limited to, the system may send notification, through an E-mail, to each of the users having the interest in travelling or who follow the same route from the first location to the second location. The user may also communicate messages to share or exchange activity, product, or service with other users.

In an embodiment, each registered user of a client device, such as the client device 104a, may post the information corresponding to the product, service or activity that the user wants to share or exchange with other users of the system 108. For example, the user may announce an activity, such as bike riding, or post a request for resource sharing or exchanging. Further, the user may post one or more conditions corresponding to post or announcement. The conditions may include, but are not limited to, information or terms corresponding to the posted request or announcement for sharing or exchanging. For example, the user may post the conditions such as time of ride, maximum time window for pick-up, maximum time window for drop off corresponding to the bike riding.

Similarly, the user may post a request for ride sharing or exchange of services or equipments. For example, the user may post a request for service corresponding to baby sitting in exchange of any other service or product. Further, the user may post conditions corresponding to such request, for example, the user may announce timings for receiving such service. Accordingly, the other users of the system 108 may show their interest corresponding to the post by accepting the announcement.

Further, in an embodiment, the user may ask for bids, from other users of the system 108, for providing services based on the request/announcement posted by the user. Correspondingly, the other users may bid for the share or exchange for services or product. In an embodiment, the system 108 may search for suitable other registered users (having their profiles of the system 108) based on the request/announcement posted by the user. In this embodiment, in one case, the system 108 may analyze the profiles of the registered users of the system 108 based on the request/announcement and corresponding conditions posted by the user. For example, if the user announced an activity for bike riding then the system 108 may search for other users having interest in biking or travelling. In an embodiment, this may be determined by analyzing the hobbies of the other users. Accordingly, the system 108 may determine the suitable users for sharing or exchanging the activity, service or product based on the request or announcement posted by the user.

Further, it may be appreciated by a person skilled in the art that the sharing and exchanging through the system 108 in the network 106 may not be limited for activity, product and services. Further, each user may share information in any form such as text information, multimedia information and the like. For example, if a user is willing to travel from the first location to a second location and seeking guidance in travelling route or weather conditions for the second location or any other information in this regard, then the user may post the request for corresponding information. Other users of the system 108 may share their experiences in the second location that the user may be willing to know. Further, the other users may share other information to guide the user (who posted the request) regarding short route for travelling to the second location. In an embodiment, the system 108 may notify the user regarding other suitable users of the system 108 who have traveled to the second location and may provide guidance to the user. The system 108 may determine about the suitable users from the profile created or activities posted by the other suitable users. It may be apparent to one skilled in the art that here, the user may be the registered member of the system 108 who announces an activity or posts the request and other users may include other registered members of the system 108 who can view the announcement/post and may accept/reject the request. Further, the system 108 may search for the other users who may be suitable to share or exchange of resources. The system 108 is explained further in more details in conjunction with FIG. 3.

FIG. 2 illustrates another exemplary environment 200 where various embodiments of the present invention are implemented. The environment 200 includes a server 202 connected to a plurality of client devices 204a, 204b . . . 204n via a network 206. The client devices 204a, 204b . . . 204n (hereinafter may collectively be referred to as "client devices 204") include communication devices that may be utilized by users to access the server 202. Examples of the client devices 204 may include, but are not restricted to, a personal computer, a mobile phone, a smart phone, a personal digital assistant (PDA), a tablet computer, a laptop, and the like. The Network 106 may include, but is not restricted to, a communication network such as Internet, PSTN, Local Area Network (LAN), Wide Area Network (WAN), Metropolitan Area Network (MAN), and so forth. In an embodiment, the network 206 can be a data network such as the Internet.

Further, the server 202 may include a system 108 to support sharing and exchanging among the users of the client devices 204 (hereinafter referred to as "users"). The system 108 may facilitate the share and exchange of an activity, service or product among the users through the network 206. In an embodiment, the users of the client devices 204 may be required to register with the system 108 for sharing and exchanging the activity, service or product (hereinafter 'activity, service or products may collectively be referred to as 'resources'). Further, the messages exchanged between the server 202 and the client devices 204 may comprise any suitable message format and protocol capable of communicating the information necessary for the server 202 to provide a desired service to the client devices 204. In an embodiment of the present invention, the messages comprise hypertext transfer protocol (HTTP) messages.

Further, the environment 200 illustrates links between the client device 204a, the client device 204b and the client device 204c. As shown the client device 204a and the client device 204b are connected through a link 208. Similarly, the client device 204b and the client device 204c are connected through a link 210. These links represents a relation between the users corresponding to the client devices. Such relations may include, but are not restricted to, friendship, family relation, neighbours, business relation and the like. For example, the user of the client device 204a may be a friend of the user of client device 204b. Similarly, the user of client device 204b and the user of client device 206c may be business associates or colleagues in the same company. Further, the users may be directly or indirectly related to each other. For example, the user of the client device 204a (that is shown as connected to the client device 204b) may be a direct friend of the user of the client device 204b. Similarly, the user of the client device 204b may be a direct friend for the user of the client device 204c (as shown connected through a direct link). Therefore, the user of the client device 204a may be considered as indirectly related (as friend of friend) with the user of the client device 204c.

Further, in an embodiment, such links may be tracked by the system 108 to determine the relations between the users. Further, each user may limit the posting or announcements to specific users based on the relations. For example, if a user, such as the user corresponding to the client device 204a, posts a public request for sharing a ride, then in an embodiment, the request may be shown to all the registered users of the system. Further, if the user of the client device 204b wants to show his post only to his/her friends, then the system 108 may make the post visible only to friends, such as the user of the client device 204a and the user of the client device 204c. Furthermore, if the user of the client device 206b is willing to show his/her post only to his/her colleagues of a company then the system 108 may make the post visible only to the user of the client device 204c.

For example, if a user needs someone to look after his/her house for one week in his/her absence. The user may want anybody whom he/she can trust on for such responsibility of looking after the house such as his/her family members, close friends and the like. Further, the user may not want this information (of his absence from his/her house for one week), to be leaked to any other user. In such situation, the user may select one or more credible users (members) of the system 108 or may select a pre-defined group of members (corresponding to his/her profile) that may include his/her family and/or close friends. The social networking website may then show the posting of the user to only the selected members and may strictly hide the information to be leaked to any other member.

Further, based on the posting, one or more other users of the system 108 may accept the request posted by the user and accordingly the resources may actually be shared and/or exchanged between them. Subsequent to the actual sharing and/or exchanging based on the accepted request corresponding to the post, the user and the one or more other users may provide rating to each other based on their performances corresponding to sharing/exchanging. User's ratings may be explained further in conjunction with FIGS. 3, 4 and 5. Further, the system 108 may determine the credibility of users for sharing and/or exchanging resources with a first user based on various factors such as their relations with the first user, ratings received from other users of the system 108 and the like.

FIG. 3 illustrates exemplary block diagram of a system, such as the system 108 (as described in conjunction with FIG. 1 and FIG. 2), to support sharing and exchanging, in accordance with an embodiment of the present invention. In an embodiment, the system may be utilized as a plug-in for other system or a social network. In another embodiment, the system may be implemented as a social networking system. The system 108 includes a processor 302 and a memory 304. The memory 304 includes a database 306. The database 306 may store information about users of the system 108. Each user may need to be registered with the system 108 by creating a profile thereon. The profile may be created by entering one or more information, such as personal information, professional information and the like, corresponding to the user.

The system 108 may facilitate each user for announcing a request corresponding to sharable/exchangeable activities, services or products (hereinafter referred to as 'resources') for inviting other users (hereinafter referred to as 'second users') of the system 108. Hereinafter the user who posts/announces any request/information on the system is referred to as 'first user'. Further, hereinafter, the users of the system 108 who are invited by the first users, for the posted/announced request/information, may be referred to as the 'second users'. Furthermore, the users (other than the first user) who may accept the request posted/announced by the first user may also be referred to as the second users. Further, the user may post one or more conditions corresponding to the announcement. The conditions (as posted by the first user corresponding to the sharable/exchangeable activity/service/product) may include, but are not limited to, at least one of type, time, location, compensation, security collateral or required skill level corresponding to the sharable activity, service or product. For example, if the sharable activity, service or product is vehicle sharing or ride sharing with one or more second users then the conditions corresponding to the ride (or vehicle) sharing may include, but are not restricted to, date of the ride, time of the ride, maximum time window for pick-up, and maximum time window for drop off corresponding to the ride.

In an embodiment, the conditions may be mandatory to be followed by the second users, if the second user accepts a request corresponding to the announcement. In another embodiment, the conditions may be negotiable between the first user and one or more second users who are interested in the posted/announced request/information. The system 108 may determine about one or more suitable second users that may be recommended to the first user corresponding to the post of the first user. The suitable second users corresponding to the post/announcement may be determined based on matching between the profile of the first user and the profile of each of the second users. In one embodiment, the system 108 may determine the matching of the first user with the second users by matching the one or more conditions with information (such as profile information) corresponding to the second users. If the one or more second users meet the conditions then the second users may be considered as suitable second users for the announced activity/service/product.

Furthermore, the memory 304 of the system is coupled to the processor 302 and includes the database 306 to store information about each of the first users and second users of the system 108. The information corresponding to the first user and the second user may include, but is not limited to, personal information (such as name, location, hobbies and the like), professional and educational information (such as qualification, work industry, designation and the like). Further, the information corresponding to the first user may also include information corresponding to post/announcements for sharing/exchanging activities, services or product. The first user may announce/post request/information and corresponding conditions associated with activities/services/products for inviting one or more suitable second users. The system 108 may facilitate the second users to accept one or more sharable/exchangeable activity, service or product that may be announced/posted by first users.

Further, the memory includes one or more instructions that may be executed by the processor 302 to provide support for sharing and exchanging at least one of an activity, a service, a product or information. The processor 302 of the system 108 may search for suitable second users of the system 108 by matching the content and/or type of the announcement or request made by the first user with the profile information of the other users of the system 108. Examples of the types of announcements or requests may include, but are not limited to, sports, education, health, hospitality, food, transport, security, pets, charity, adventure, personal, social or business etc. The profile information may include, but is not limited to, the hobbies/interests, residential/business addresses, recent activities, public ratings, profile points etc. The public rating represents rating provided by the other users based on the shared/exchanged activity/service/product between them. In an embodiment, the public rating may be a rating provided by a first user to a second user and vice-versa for a specific activity shared/exchanged between them. In another embodiment, the public rating may be an average rating of a user (such as the first user or the second user) that may be received from all other users of the system 108 based on sharing/exchanging/purchasing/selling an activity, a service, a product or personal item, an information and the like.

Further, the profile points include points that may be earned by a user based on sharing/exchanging/purchasing/selling any activity, a service, a product, personal item, or information with other users of the system 108. Further, the earned profile points may be utilized by the user in further sharing or purchasing any activity or service or a product with other users of the system 108. In an embodiment, profile of each user may be initialized with zero '0' profile points.

The processor 302 may then inform the first user about one or more matching profiles of the second users that are suitable to the announcement or request made by the first user. In an embodiment, the processor 302 may select only those profiles of the second users of the system 108 that satisfies all of the conditions posted by the first user corresponding to his/her announcement or request for sharing/exchanging/purchasing/selling any activity, a service, a product or personal item, an information and the like. Further, in another embodiment, the processor may provide information corresponding to the other users (of the system) having less relevancy based on the matching (as described above) between the conditions of the first user and profiles of the second users. In this embodiment, the other users may have greater relevancy based on some other criteria such as common interest, location as that of the first user.

In an exemplary embodiment of the invention, the sharable activity, service or product may include sharing a ride by the first user with one or more of the second users. For example, a first user announces a ride sharing service to be shared a certain date and time. The first user also adds certain conditions corresponding to the ride sharing service. The conditions may include, but are not limited to, date on which the first user is willing to share his/her ride, time of the day at which the first user is willing to pick up the second user, Initial location from where the first user will pick up the second user, destined location at which the first user will drop off the second user, and maximum time window selected by the first user for picking up and dropping off the second user from/to the destined location. For example, the maximum time window for pick up selected by the first user may include a maximum time at which the first user may pick up the second user. The maximum time window for pick up may also include the maximum time up to which the first user may wait for the second user to join the first user. The maximum time window for dropping off may include a maximum time to reach to the destined location of the second user.

In another exemplary embodiment of the invention, the sharable activity, service or product may include share of sports activity or invitation to play any sport. For example, a first user may announce a cricket event on certain date and time at a specific venue. The first user may also add certain conditions corresponding to playing the sport. The conditions may include, but are not limited to, need for experienced players (second users), need to be in certain uniform, need for males only, need for the players of a particular age group (such as less than thirty years). The processor 302 may send a message to all of the users of the system 108 corresponding to the announcement made by the first user. In case a user accepts to play with the first user, the processor 302 may then notify the first user corresponding to acceptance of the invitation to play cricket by a user (or a second user). The first user may then scan the profile of the user and may or may not approve the second user for being a part of the sports activity.

If the second user gets approval from the first user, the processor 302 may then inform the second user about his selection/approval for the sports activity. Similarly, if the second user is rejected by the first user then the second user may be informed suitably by the processor 302. Further, in an embodiment, the system 108 may inform other approved second users (who are already approved by the first user corresponding to the announced sports activity) about approval of another second user for the shared sports activity. Due to this, the other users may remain updated about the fulfillment of the conditions corresponding to the sports activity. For example, if for 'cricket' activity (as posted by a first user), '11' members are required and 9 members have been selected (Approved) by the first user and '2' more members are required. Then by sending the notification to the all 9 approved members about a new approved second member for the 'cricket', the all '9' members may be updated that now only '1' more member is required to meet the condition (of '11' members) for the activity 'cricket'.

The processor 302 of the system 108 may also search for certain users of the system 108 that lives nearby the venue specified by the first user in the announcement. Further, the processor 302 may shortlist the users having mentioned about cricket in their profiles as hobby or interests or profession etc. Furthermore, the processor may shortlist the users based on their gender and age. The processor 302 may then suggest the shortlisted users to the first user. The first user may then view the profiles of the shortlisted users suggested/recommended by the system 108 and may further filter the suitable users based on his/her preferences. The processor 302 may then send a notification to all the suitable users about the approval in participating in the 'cricket' activity. The notification may include, but not limited to, the detailed information about the sports event announced by the first user. The notification may also inform the suitable users about the approval of the first user for participating in the activity. Further, in an embodiment, the processor 302 may directly approve the user, if the suitable user accepts the notification. Accordingly, the system 108 may keep a record (in the database 306) of the final shortlisted users for the activity ('cricket') as posted by the first user.

Further, based on the record (that may contain a list of the approved second users) and activity information (such as conditions like when the activity is to be performed), the processor 304 may determine whether the activity is completed or not. Further, the system 108 may ask each of the first user and the second users to confirm about the status of the activity that whether the activity is 'completed', 'pending', 'extended', 'expired' and the like. The status corresponding to any activity may define the situation in which the activity is present. The status 'completed' or 'pending' may denote that the activity is completed or pending respectively. Further, the days and time for the activity may be extended due to some reasons or mutual consent of each member of the activity then the status may be set as 'extended. Correspondingly, any or each member may update the activity information by entering the updated date therein.

Based on the status, the processor 304 may send timely reminders to each of the first user and the second users (who participated in the activity) for providing rating/review to each other member of the activity. For example, if the status of the activity is 'completed' then the processor 304 may notify each of the members to provide rating to each other based on their experiences in sharing the activity ('cricket'). Accordingly, each user may provide rating to other users based on their experiences with others in sharing the activity (such as while playing the 'cricket'). Such ratings may add a value to a user's profile that may be considered to determine the credibility of the user. Based on activity specific rating, an average rating may be calculated by the processor 304 that depicts the overall public rating, for the user, based on ratings received for all the activities/services/products shared/exchanged between the users.

Further, based on the rating received by each user, the processor 304 may determine credit points based on sharing the activity, service, product with other users. For example, based on the rating received by a user for a particular activity, the processor 304 may calculate the amount of points that may be credited or debited to/from the user's account. Further, the processor 304 may determine the credit points based on various factors such as the type and duration of the activity/service shared/exchanged between the users. Furthermore, the processor 304 may credit/debit points to/from the user's account that may be pre-set between the users who share/exchange the activity/service/product. for example, if the first user shares a personal item with other user (second user) then based on the pre-set amount, the first user may receive '5' points as a credit for sharing the personal item with the second user. Correspondingly, the '5' points may be debited from the account of the second user for sharing the personal item of the first user. In other words, the '5' points may be transferred from the second user's account to the first user's account. Further, the processor 304 may send a notification to the first user and the second user(s) for corresponding credit and debit of pre-set number of points based on sharing at least one of the activity, service or product between them. In an embodiment, the processor 304 may facilitate each user of the system 108 to utilize credit points for sharing/exchanging/purchasing any activity, service, product or information that may be announced by one or more other users of the system.

Further the processor 304 may send notifications to each user based on the activity performed corresponding to the user. Such notification may be sent through various means such as Email, SMS, profile notification and the like. The profile notification includes notification to a user (corresponding to the profile) by posting the message of notification within the profile of the user. For example, the processor 304 may send emails to first user and the second users for providing rating to each other. Similarly, the processor 304 may send emails to the first user and the second users for corresponding credit or debit of pre-set number of points.

FIG. 4 illustrates exemplary structure of a database 400 for storing information corresponding to users of the system, in accordance with an embodiment of the present invention. The database 400 stores information corresponding to users of the system 108. In an embodiment, the users are registered members of the system 108 having profile thereon. Based on the registration, each user may be assigned with a unique user ID, as represented by user ID 402. For each user, the database 400 may store various information such as profile information, information corresponding to announcement, average public rating, profile points and the like, corresponding to the user.

As illustrated, the database 400 includes columns containing information such as profile information 404, announcement/request 406, average rating 408 and profile points 410. The database 400 may store such information for each user of the system 108. Further, as shown, row 412, row 414 and row 416 represent information corresponding to user 1, user 2 and user 3 of the system 108 respectively. Here, user 1, user 2 and user 3 represent user IDs. Further, for each user, the profile information 404 may include information corresponding to a profile of a user that may be provided by the user while registering with the system 108. For example, the profile information 404 may include, but is not restricted to, personal details, as represented by column 418, qualification and other information, as represented by column 420. The personal details may include, but are not restricted to, information like name, location, hobby, and the like. Similarly, qualification and other information may represent non-personal information such as, but are not restricted to, information corresponding to education, profession, industry, designation, and achievements of a user.

As shown, the personal details 418 (corresponding to the user 1) include name 'A', location 'L1' and hobby 'H1'. Similarly, the personal details 418 of the user 2 represents name 'B', location 'L2' and hobby 'H1' corresponding to the user 2. Again similar, name, location and hobby of the user 3 are represented by 'C', 'L3' and 'H3'. Here, it may be noted that hobby of the user 2 is same as the hobby of user 3, as shown by 'H1'. Further, each user of the system 108 may request or announce an activity, service or product that may be sharable or exchangeable with one or more other users of the system. As shown, column 406 (for requests or announcement posted by users of the system 108) includes information corresponding to activity, service or product and corresponding conditions (as represented by column 422 and column 424 respectively). Hereinafter, the activity, the service or the product may collectively be referred to as 'the resources'. The users may be facilitated to post a request or announcement for sharing or exchanging at least one of the resources with one or more other members (users) of the system. Hereinafter, the user who posts the request or announcement may be referred to as the 'first user' and remaining registered members (users) of the systems may be referred to as the 'second users'.

In an embodiment, a user (the first user) may post a request or announcement for all the second users (users other than the first user) of the system 108. In another embodiment, the first user may post a request for a specific group of people such as friends, relatives, business associates and the like. Each user may be facilitated to define one or more groups by adding specific people therein. Further, corresponding to each request or announcement, the first user may post one or more conditions for sharing/exchanging the at least one of the resources. The column 422 stores details corresponding to the sharable and/or exchangeable resources, for example, as shown, an exchangeable service such as 'House Keeping' may be posted by the user 1. This post is for inviting one or more second users for accepting the conditions (as shown by column 424) corresponding to exchangeable service i.e. 'House Keeping'. In an embodiment, the first user may make the conditions mandatory for accepting the posted sharable/exchangeable resource(s). In this embodiment, if a second user accepts the posted information corresponding to a resource (Service for house-keeping) then it is considered that the second user accepts all the conditions corresponding to the post. Further, in another embodiment, if the first user post an announcement for selling of resource and asks for bid for that particular resource, the second user may bid for the resource based on the announcement.

Further, as shown, a request posted by the user 1 for house-keeping with conditions (represented by column 424) is stored in the database 400. The conditions may include, but are not limited to, timeline required to perform the activity or service, date/day for performing the activity or the service, requirement of number of volunteers (second users) to perform or participate in the activity or service, and place of performing the activity. Specifically, as shown, the conditions posted by the user 1 for the 'house-keeping' activity/service include timeline such as 6 AM-7 PM, day for performing the activity is 'Sunday' and number of the second users required is '1'. Similarly, the service posted by the user 2 is 'Babysitting' with conditions representing the time, date and volunteer (Second users) requirement for the User 2. Specifically, the conditions posted by the user 2 include time as 5 AM-11 AM, day as 'Monday' and numbers of the second users required is '1' and the condition that second user required is a female for baby-sitting service. Again similar, the posting corresponding to the user 3 includes an activity 'Cricket' and corresponding conditions represent the time, date and volunteer (Second user) requirement to perform the posted activity. Specifically, as shown, the information stored corresponding to the user 3 includes activity as 'Cricket' and conditions include time to play cricket is 6 AM-10 AM, date of the activity 22 Feb. 2012, number and type of second users required is 10 males.

In one embodiment, the first user may be facilitated to post an activity, service, product (Herein, 'activity', 'service', and 'product' may collectively and intermittently be referred to as 'resource') or information for inviting specific set of second users (users of the system 108 other than the first user). For this, the first user may be facilitated to post an activity according to the type thereof. For example, the first user may post cricket as of the type 'sports activity'. In an embodiment, the second users having hobby or interest in 'sports' may directly search any post corresponding to 'sports' if the corresponding information is posted according to the 'type' of the activity by the first user. Further, this may enable the system 108 to search for suitable second users who are suitable and credible for the posted activity. For example, to search second users those may be interested in the posted service, in an embodiment, the system may determine the type of posted activity, service or product and accordingly, the system may search for suitable second users those may be interested in sharing or exchanging the resource (corresponding to the post) based on the hobby or activities of the second users. Further, if the profile of the second user includes information regarding his/her hobby as related to 'sports' then in an embodiment, the system 108 may suggest the first user about the second users as suitable for the activity/service corresponding to the post.

Further, the average public rating (as shown by column 408) represents an average rating received by each user from one or more other users (of the system 108) based on his/her previous experiences in sharing/exchanging resources or information. Further, as shown average public rating for the user 1, based on his/her past experiences with other users, is '3'. Herein, the rating '3' may be provided by the system 108 based on the individual ratings received, by the user 1, corresponding to sharing and exchanging of the resource or the information with other users. Here, it is understood (based on the aforementioned explanation) that the user 1 can receive individual rating by being either the first user (who posts the request/announcement) or one of the second users (other users of the system excluding the first user) of the system. The individual rating is explained further (as 'activity specific rating') in conjunction with FIG. 6. Similarly, average rating for the user 2 and the user 3, based on his/her past experiences with other users, is '5' and '1' respectively.

Furthermore, the FIG. 4 shows overall profile points (as depicted by column 410) that may be accumulated by a user from all the previous sharing/exchanging of activities, services or product. For example, if the user 1 earn '10' points by being the first user two times (considering '5' points credit for each time of sharing/exchanging) in previous experience of sharing/exchanging and further, if the user 1 loses '5' points by accepting any service offered by any other first user (considering debit of '5' points) then the overall profile point will be '5' (10-5) that may be referred to as 'overall profile points' for the user 1. In an embodiment, each registered user may have his/her account containing points earned by the user through sharing/exchanging activities/resources with other users of the system. These points may further be utilized by the user for requesting other users of the system for sharing/exchanging activities, services, products. Further, it may be appreciated by a person skilled in the art that the user may utilize the earned points in purchasing one or more activities, services or products. In other words, the user may sell the points for receiving the services or products from the other users. The points credit/debit corresponding to activities/services shared/exchanged is further explained in conjunction with FIG. 5.

Further, as shown in FIG. 4 of the invention, the activity/service/product corresponding to the column 422 posted by the user 1 includes service of house-keeping. Further, in condition, the user (first user) posted a requirement of one person who can take care of his/her house on the required date/day (mentioned as 'Sunday') between 6 AM-7 PM. Other users (second users) of the system, who can see the post, may respond to the post by accepting the posted service. Further, before responding to the post, the other users may check the average public rating of the first user to confirm his/her credibility. Accordingly, the other users may decide whether to accept the request posted by the user or not. Further, the first user may be notified if one or more of the second users accept the post. Accordingly, the first user may assign the service for house-keeping to one or more second users who accepted the posted request corresponding to the house-keeping. In an embodiment, one of the second users who accept the posted service by the first user will be assigned to complete the posted request. Further, the system 108 may send one or more reminders to the accepter to complete the assigned work. In another embodiment, if multiple second users accept the request posted by the first user then the first user may be provided with the details of the all such second users who accept the posted service. The first user may then select one or more users from the second users who accepted request (hereinafter referred to as the 'request acceptor'). In an embodiment, the system 108 may further notify the second users about the action taken by the first user. For example, the system may inform the second users (request acceptor) about whether they have been accepted or rejected by the first user who posted the service request.

In an embodiment of the invention, the system may inform one or more second users about the announcement/request posted by the first user. The one or more second users may be selected by the system 108 based on the hobbies or personal information of the second user. For example, if the first user posts an activity corresponding to cricket in 'X' ground (venue) then the system may analyze the profile information, such as hobbies and location, of the second users. Based on analysis, if it is determined by the system that the profiles of one or more second users (users other than the first user) match suitably (hereinafter may be referred to as 'matched second users') with the activity and corresponding conditions posted by the first user then the system 108 may provide information corresponding to those matched second users to the first users. For example, based on the post of the first user, the system may analyze the hobby (of each second user) if matches with type of the activity i.e. 'sport' and location of the activity (as posted along with the activity by the first user) matches with the location of the second user then the system 108 may consider that second user as suitable for the post and accordingly the system 108 may provide information corresponding to the second user to the first user.

Further, in an embodiment, the first user may be facilitated with an option for restricting the post from publicizing to all the second users or for sending the request or post only to specified group of second users, then in an embodiment the system may search for a suitable second user from the specified group. In this embodiment, the system may not recommend other users of the system who are not the part of the specified group. Further, in another embodiment, the system may search suitable users from all the registered second users of the system and may send the recommendation to the first user based on the post and corresponding conditions. For example, if the first user has chosen an option for displaying the post only to the friends of the first user, then in this case if none of the friends of the first user accepted or responded for the post of the first user till some pre-fixed time, the system may start providing recommendations to the first user for some suitable second users. Further, it may be appreciated that in this case, the system 108 may not display information corresponding to the post (that has been restricted, by the first user, to the specific group of friends) to any of the second users to maintain the privacy of the matter posted by the first user.

FIG. 5 illustrates exemplary structure of a database 500 for storing information corresponding to users of the system, in accordance with another embodiment of the present invention. The database 500 stores information corresponding to users of the system 108. In an embodiment, the users are registered members of a system, such as the system 108, having profile thereon. Each user may register himself/or herself by creating a profile (an account) on the system. Based on the registration, each user may be assigned with a unique user ID, as represented by user ID 502. For each user, the database 500 may store various information such as profile information 504, information corresponding to announcement/acceptance 506, rating or review 508, earned points 510 and the like, corresponding to the user.

As explained earlier in conjunction with FIG. 4, corresponding to each registered user of the system, such as user 1, user 2 and user 3 (as represented by the column 512, column 514 and column 516 respectively), the profile information 504 may include, but is not limited to, personal details 518, qualification and other information 520. The profile information 504 may be provided by each user while registering with the system. The personal details 518 may include personal information such as name, location, hobby and the like. Further, qualification and other information 520 may include, but not limited to, educational information, professional information such as industry, experience, designation, achievements and the like.

Further, the announcement/acceptance 506 may include, but is not restricted to, information corresponding to sharable/exchangeable activity, service, product, information and the like that may be posted by a user of the system (hereinafter referred to as the 'first user') and information about status for the post, such as accepted, completed, pending and the like. Specifically, as shown, the information corresponding to announcement/acceptance 506 includes an activity/service/product 522, conditions 524 and a status 526. The activity/service/product 522 represents at least one of an activity, a product, a service or information that may be posted or announced by the first user for one or more other users of the system. Hereinafter, the one or more second users of the system may be referred to as the 'second users'. The first user may post or announce for sharing or exchanging an activity, service, product or information. Further, the conditions 524 may represent the conditions posted by the first user corresponding to the posted announcement/request. Further, the status 526 illustrates the status of the posted sharable/exchangeable activity/service/product/information. Specifically, the status 526 may include, but is not restricted to, 'completed', 'accepted', 'pending', and the like.

Specifically, as shown, the user 1, the user 2 and the user 3 have the names as 'A', 'B' and 'C', locations as 'L1', 'L2' and 'L3', and hobbies as 'H1', 'H1' and 'H2' respectively. Here, it may be noted that the hobby of the user 1 is same as the hobby of the user 2. Further, the column 522 shows the activity 'Bike riding' posted by the user 1. Further, the column 524 shows the conditions (posted by the user 1) corresponding to the 'Bike riding' such as time '6 AM-7 AM', Day as 'Sunday' for carrying out the activity, and number of persons required is '1'. Similarly, as shown, the user 3 has posted the service for 'Kid Care' and condition mentioned includes the time between 8 AM-7 PM corresponding to the service. Further, the user 2 has not posted any activity/service/product or information.

After posting an activity, a service, a product or an information by the user 1, in one embodiment, the system searches for one or more suitable second users by analyzing the profiles of all registered second users (other than the first user) of the system to determine a match between profile of each second user and the conditions corresponding to the post/announcement of the first user. In this embodiment, the system analyzes the location, qualification, hobby, activities, post (if any) and other profile information corresponding to the second users. Further, the system provides information about the determined suitable second users (corresponding to the post and associated conditions) to the first user. As shown, the hobby of the user 1 ('H1') is same as the hobby ('H1') of the user 2, the system may provide information about the profile of the user 2 to the user 1. For example, the hobby ('H1') may include travelling, biking or riding that may be matched with the activity 'Bike riding' posted by the user 1. Based on such matching, the system may search one or more suitable second users those can accept the post/announcement of the first user. Subsequently, the system may provide notification to the first user (the user 1) to inform him/her about the suitable second user (such as the user 2). Similarly, in an embodiment, the system may notify the suitable second user (the user 2) about the post of the first user (the user 1).

Further, in another embodiment, the user 1 may also be facilitated to search for one or more suitable second users relevant for the post/announcement. Furthermore, the user 1 may be facilitated to restrict the search to a particular group of people. For example, the first user (such as the user 1) may restrict the post for second users of a particular age group then the system may search the suitable second users of that particular age group. Also, the second users may search any such activity, service posted by the first user.

Further, on receiving the information about the post by the first user, the second users may accept the post of the first user. For example, if the user 2 likes to share the activity of 'bike riding' with the user 1 then the user 2 may choose an option to accept the activity. Further, the accepted activity may be carried out by the user 2 based on the conditions. Accordingly, the status corresponding to the post may be set as 'accepted' (as shown) in the profile of the user 2 and completed (As shown) in the profile of the user 1. Initially, if the post is not accepted by any of the second users then the status may be shown as 'pending'.

Based on the activity shared/exchanged by the first user and one or more second users, the first user and the one or more second users may provide rating to each other. If they liked the activity shared/exchange with each other, they can give more rating and if they don't like, they can give less or zero rating based on their experience in carrying out the activity or service. For example, considering rating from '1' to '5' where '5' being the highest and '1' being the lowest rating, the user 2 has given rating '5' to the user 1 based on his/her experience of sharing the bike riding with the user 1 and the user 1 has given rating '4' to the user 2 based on his/her experience with the user 2 (as shown). If the first user gets bad experience in sharing/exchanging any activity/service/product or feels that the second user (with whom the activity/service/product was shared by the first user) was not good or intellectual or like-minded then the first user may give bad/low rating. Further, the system may send periodic reminders to both the first user and one or more second users to provide ratings to each other corresponding to actual sharing/exchanging of the activity/service/product between the first user and the one or more second users.

In one way, the rating provided by a user shows his/her interest in sharing/exchanging the service/activity/product again with the same user. Also, the rating received by each user may be added to his/her previous ratings received from other users (for any such sharing/exchanging activity/service/product with the other users) to determine average rating of the user (as explained previously in conjunction with FIG. 4). The average rating of the user may be visible to all other users of the system through the user's profile. For example, if a user receives rating of '4', '2', '3', and '5' after sharing/exchanging four different activities/services or products with four different users, then, accordingly, the average rating of the user may be equivalent to '3.5' that may be made visible to all the users of the system.

Further, in an embodiment, an account (profile) of each registered user may be initialized with '0' points that may be increased or decreased based on sharing/exchanging/selling a particular activity/service/product posted by the first user. These points may be credited or debited from the user's account based on sharing/exchanging any activity/service/product. for example, if the first user announces a service for car sharing from one location to another and sets '5' credit points for the service then '5' points may be debited from an account of a second person who accepts the posted service of the first user and correspondingly, '5' points may be credited to the account of the first user for providing the service. In an embodiment, based on the status of activity, and date of performing the activity, and rating/review provided by the users associated with the performed activity, the system may determine whether the activity has actually been carried out (shared/exchanged) between the first user and the one or more second users of the accepted activity. Accordingly, the system may provide credit points to the users. For example, if the status of the post, corresponding to a service, is completed and the first user (who posted the service) and the second user (who accepted the service) have given ratings to each other then it may be determined that the activity has actually been performed by the users (the first user and the second user). Accordingly, the system may assign '+5' credit points to the first user and '-5' credit points to the second user. The '+5' credit points denote credit of '5' points to the first user's account and '-5' credit points denote debit of '5' points from the available points in the account of the user. Here, '5' points may be pre-set by the users before sharing/exchanging the activity/service/product.

Further, in an embodiment, the system may set minimum credit points based on type of activity/service/product and conditions. The type of activity/service/product may include, but is not limited to, recreational activity, riding, sports, and house exchange. For example, based on the type of activity, such as vehicle sharing, the system may set minimum '+5' as credit points for the first person who shares his/her vehicle and '-5' for the person who accepts sharing of the vehicle of the first user. Furthermore, in another embodiment, the first user may ask for bid from one or more second users for the post. The second users may bid based on their interest in the posted activity/service/product. Accordingly, based on the bid amount of each user and credibility of each user based on their profile, one or more second users may be selected for the posted activity/service/product. Additionally, the first user may ask a compensation amount that may be provided by the second users for sharing a vehicle. Further, based on the decided amount, the second user may provide some of his/her points to the first user. For example, if the second user is willing to accept a post for vehicle sharing (from one location to another) for some 'X' amount/month and amount 'X'='Y' points. Then the system may debit 'Y' points from the second user's account and may credit the 'Y' points in the account of the first user. In an embodiment, number of points (say 'Y') for some amount (say 'X') may be fixed by the system and in another embodiment, number of points for the amount may be decided manually by the first user and the second user.

As shown, the user 1 earns '+5' points and the user 2 is assigned with '-5' credit points for the completed activity i.e. 'Bike riding' (as shown). In an embodiment, such points, as earned by the first user and the second user may be a form of virtual money that may further be utilized in sharing/exchanging/selling of any activity/service/product with any other user of the system. Each user (first user or second user) may determine credibility of other user (first user or second user) before sharing/exchanging an activity/service/product/information and before setting credit points for any such activity/service/product/information. Further, the first and second users may determine the credibility of each other based on their profiles and rating/review.

Again similarly, as shown, the user 3 has posted a service for Kid care between 8 AM-7 PM. For this, the user 3 may first ensure about the credibility of any second user for assigning the service of 'Kid care'. The user 3 may be sure about the credibility of the second user by viewing the previous ratings (of the user 3) and experience in sharing/exchanging/handling such activity, before allowing the second user to handle the kid. Further, it is shown that the post of the user 3 is pending as the responsibility (activity) of kid care is not assigned to any second user and accordingly, there is no rating for the user 3 for this post and thus points earned corresponding to this post (of kid care) is zero ('0').

FIG. 6 illustrates exemplary structure of a database 600 for storing information corresponding to users of the system, in accordance with yet another embodiment of the present invention. The database 600 includes a list of first users and a list of second users. The first users are members of the system who post one or more requests for sharing/exchanging/selling an activity/service/product/information. The second users include all members of the system other than the first user. Further, the first user and the second user correspond to a particular post/announcement. In other words, the first user for one post may be a second user for any request posted by any other first user. Further, the system may search for one or more suitable second users, for a post, from the list of second users.

As shown in FIG. 6, the database 600 shows various requests posted by various users. Each user has a unique user ID, as represented by column 602 (of the database 600), that represents unique identification code of a user of the system. Further, profile information 604, and announcement/acceptance 606 are explained earlier in conjunction with FIGS. 4 and 5. An activity specific rating 608 represents rating/review provided to the second user who completes the specific active/service (posted by the first user). Further, the database 600 includes accepter IDs 610 corresponding to each post that has been accepted by one or more second users. Specifically, the accepter ID includes information corresponding to the second user who accepts the request posted by the first user. Furthermore, the database 600 shows a row 612, a row 614 and a row 616 corresponding to a user 1, a user 2 and a user 3 respectively.

The profile information column 604 of the database 600 represents personal details (as shown by column 618) and qualification and other information such as business details (as shown by the column 620) of the each user of the system. Specifically, the personal details corresponding to the user 1 includes name 'A', his/her location 'L1', and hobby 'H1'. Further, the qualification and other information includes qualification, professional, and other information as 'Q1' Similarly the user 2 has a name 'B', location 'L2', hobby 'H1' and qualification and other information as 'Q2'. Again similarly, the user 3 has name 'C' with location of performing the posted activity as 'L3', and having hobbies and qualification and other information as 'H2' and 'Q3' respectively.

Further, as shown Announcement/Acceptance 606 represents details of requests or announcements posted by the first users of the system. Further, the announcement/acceptance includes status information corresponding to acceptance of the posted request/announcement by one or more second users. Specifically, the announcement/acceptance 606 may include, but is not restricted to, information such as Activity/Service/Product sharing (represented by column 622), condition (as represented by column 624), and status corresponding to the posted request/announcement (a represented by the column 626). Specifically, the Activity/Service/Product sharing (as shown by the column 622) includes information that the first users may post/announce for sharing/exchanging with one or more second users. In an embodiment, the Activity/Service/Product sharing (as shown by the column 622) includes a type of announcement/post made by the first users of the system. Further, the condition (as shown in column 624) comprises the necessary conditions (corresponding to the request/announcement posted by the first user) that may need to be followed by one or more second persons (who accept the request) for carrying out one or more tasks associated with the post. The conditions may include, but are not limited to, at least one of type, time, location, compensation, security collateral or required skill level (of the second user who accepts the request/announcement associated with the post) corresponding to the sharable/exchangeable activity, service or product posted by the first user. Hereinafter, the second person who accepts the request/announcement, posted by the first user, may be referred to as the 'acceptor'). The conditions posted by the first user may or may not be negotiable based on the discretion of the first user.

Further, information corresponding to the status (as shown by column 626) represents whether the announcement or request posted by the first user is accepted, completed or pending by the second user. In an embodiment, request or announcement posted by the first user may have an 'expired' status in case where the date mentioned in the condition (column 624) is expired and none of the second users have accepted the request or the announcement.

As per FIG. 6, request posted by the User 1 is for housekeeping service. The conditions corresponding to the housekeeping service (as posted by the first user) represents the timeline (6 AM-7 PM) required to perform the housekeeping service, the date/day (Sunday) on which the housekeeping service is to be performed, and number of volunteers (second users) to perform or participate in the service. Further, status for the post corresponding to housekeeping represents that the post corresponding to housekeeping is 'completed'. Further, the accepter ID for this post includes 'user 2' representing that the housekeeping service is completed as per the mentioned conditions by the user 2.

Similarly, the sharable/exchangeable activity posted by the user 2 is babysitting with conditions including time (5 AM-11 AM), day (Monday) and number and type of the required users (1 Female) for performing the babysitting. Further, the status corresponding to the post of the user 2 represents that the request or announcement made by the user 2 has been accepted (but not completed). Further, the acceptor ID, corresponding to the activity posted by the user 2, represents that the activity posted by the user 2 is accepted by the user 1.

As explained here above, the service (housekeeping) posted by the user 1 is accepted to be shared/exchanged by the user 2 (as depicted, the accepter ID is 'user 2') and the activity/service (babysitting) posted by the user 2 is accepted to be shared/exchanged by the user 1 (as depicted, the accepter ID is 'user 1'). Accordingly, in an embodiment, this represents an exchange of activity/service (housekeeping and babysitting) between the user 1 and the user 2. For example, the service posted by the user 1 is exchangeable with the service of babysitting posted by the user 2. In another embodiment, this represents individual sharing of the activities by both the user 1 and the user 2. For example, sharing of housekeeping service between the user 1 and the user 2 and sharing of the babysitting service between the user 1 and the user 2. Further, as shown (in row 614), the service/activity posted by the user 2 ('babysitting') is just accepted and not completed by the user 1 (as shown by the status and the accepter ID), thus the activity specific rating (shown by cell 634) provided (by the user 2) to the user 1 is blank or nil. Furthermore, as shown (row 612), the service/activity posted by the user 1 ('housekeeping') is completed by the user 2, thus the activity specific rating provided by the user 1 to the user 2 is '5'. Such activity specific rating may be provided by the user 1 on completing the service (housekeeping) by the user 2. Thus, the column 608 for activity specific rating represents the rating that the first user provides to the second user. Such rating represents the experience of the first user (user 1) in sharing/exchanging the service/activity with the second user (user 2). For example, the rating of '5' may represent that the experience of the user 1 (with the user 2 who completed the service posted by the user 1) was good (considering '5' as highest rating for the housekeeping service, as completed by the user 2).

In an embodiment of the present invention, the system may analyze such activity specific rating provided by the first user to determine one or more suitable second users for any such future activity/service posted by the same first user. For example, if the first user provides good rating of '5' to a second user for completing an activity (such as babysitting) then next time if the same first user posts the same activity, the system provide the reference of the same second user who received the good rating ('5') (from the first user) earlier for completing the same activity. In an embodiment, the system may define a common range of rating (such as '1' to '5') for sharing/exchanging all type of activities/service/product. In another embodiment, the system may define a range of rating based on the type of service posted by the first user. Yet in another embodiment, the system may facilitate the first user to pre-set the range of rating while/before posting a request/announcement corresponding to the activity/service/product.

Further, as shown, the activity posted by the user 3 is 'cricket' and of type 'sport activity'. Further, the conditions provided by the user 3 include the time (6 PM-10 PM), date (22 February, 2012) and required number and type of second users for the activity ('cricket') i.e. 11 Males. Further, the status of this activity ('cricket') is shown as 'pending' denoting that the activity ('cricket') and the corresponding conditions (posted by the User 3) is not accepted by any user of the system Further, based on the date of the activity (22 Feb. 2012), it may be determined by the system that the activity is expired or not. Accordingly, the status of the post may be shown as 'pending' or 'expired'. Further, as the activity posted by the user 3 is pending (as per the status shown) and not accepted by any of the second users of the system (as shown by the cell 632, the acceptor ID for the activity 'cricket' is blank), the activity specific rating is not provided (by the user 3) to any of the second user. Thus, the activity specific rating for the activity 'cricket' posted by the user 3 is shown (by the cell 630) as blank or nil.

The rating received by each second user depicts his/her credibility of performing/completing the activity/service/product shared or exchanged by the first user. For example, users (such as the first users who post the request/announcement) of the system may give low ratings or negative ratings to other users (such as second users who accepts/completes the requested/announced activity) in case the second users either have not performed well or the work done by the second users was not satisfactory. In addition, negative ratings can be given to the users in case of their bad behavior, fraud, theft or violence created while performing or participating in any of the accepted activity posted by any user. Similarly, the second user may provide rating to the first user after completing the activity/service shared/exchanged/assigned by the first user based on his/her experience in dealing with the first user. In an embodiment, low rating of any user may not be appreciable by other users of the system as the low rating of a user shows less credibility of the user. Consequently, the low rated users of the system may get lesser responses, for their posts/announcements, from other users in comparison to the users having higher or maximum rating value.

FIGS. 7A and 7B illustrate a flow diagram of a method for sharing and exchanging at least one of activity, service and product in a network, in accordance with an embodiment of the present invention. The method may be understood more clearly when, the description corresponding to the method, is read in conjunction with FIGS. 3, 4, 5 and 6. The order in which the method is performed is not intended to be construed as limitation, and further any number of the method steps may be combined in order to implement the method or an alternative method without departing from the scope of the invention.

At step 702, a user may register with a system, such as the system 108 (as described previously in conjunction with FIG. 3). In an embodiment, the system may be a social networking system. In another embodiment, the system may be utilized for implementation within a social network. In this embodiment, the user may need to register with a social network utilizing the system. The user may register with the system by entering his/her information to create a profile or an account thereon. The information may include, but is not limited to, personal information, information corresponding to qualification, professional information, and achievements. The personal information that may be entered by the user includes, but is not restricted to, name, location, hobbies, activities, pastime and the like. The qualification may include, but is not limited to, educational information of the user. Similarly, the user may provide information corresponding to business or employment industry of the user, designation, experience and the like. Further, the information corresponding to various achievements of the user may be entered by the user. In an embodiment, the profile of the user may be accessible to all other users of the system. In another embodiment, the user of the profile may be facilitated to make his/her profile accessible for some specific set of the users.

On registering with the system, an account may be created for the user with some credit points. In an embodiment, the user's account may be initialized with '0' credit points. Each user may be allowed to post/announce one or more sharable/exchangeable activities/services/products/information, at step 704. Hereinafter, the activities, services, or products may collectively be referred to as 'resources' Hereinafter, the user who posts/announces sharable/exchangeable resource or information may be referred to as the 'first user. The user may post one or more resources or information for inviting one or more second users of the system. In one embodiment, the one or more second users may include all users of the system other than the first user who posts the request or information. In another embodiment, when the first user posts the request or information for a specific group of registered users of the system, then the one or more second users may include the users of the specific group.

The first user may post/announce information corresponding to sharable/exchangeable resources/information along with one or more conditions corresponding to the post/announcement. For example, if a first user is interested in playing table tennis and need a partner to play, then the first user may announce a need for a partner to play table tennis on a specific date and time. The first user may also require more than one partner for the activity and may announce the need accordingly. Further, for example, if the first user is willing to go out for dining with a like-minded person of a particular age group, the first user may post an activity for dining out on a particular date with the conditions corresponding to the type of the person required to dine with. Accordingly, the second users who and interested and meet the conditions posted by the first user may accept the posted activity.

Further, at step 706, the first user may receive some recommendations for one or more second users who meet basic conditions (of the post) or who shares some common attributes (such as hobbies, professional industry and the like) with the first user. In an embodiment, the system may analyze profiles of one or more second users to match with the profile, activity and corresponding conditions (associated with a post/announcement) of the first user profile for determining one or more suitable second users for the posted resource/information. In an embodiment, the one or more suitable second users may be determined based on their hobbies and locations. For example, if the activity posted by the first user is to play a cricket at a particular location and it is determined (by the system) that one or more second users have interest in 'cricket' and reside at the location as mentioned in the post, then the one or more second users may be recommended as suitable for the post. Thus, information corresponding to the one or more suitable second users may be provided to the first user. In addition, the system may match the content of the announcement or profile information of the first user with profile information of one or more second users (hereinafter referred to as 'profile information matching') and based on the best possible match, the system may recommend most suitable second users' profiles to the first user that may be of some interest for the first user.

Furthermore, at step 706, based on the profile information matching, the one or more suitable second users may also be notified (by the system) about the announced activity or service or product based on their interests/hobbies. The second users may accept the announced shareable activity, service or product based on their likings or interests. Accordingly, the first user may get notification regarding acceptance of the posted activity, service or product by the one or more second users.

At step 708, if the first user gets more than one notification of acceptance by more than one second user. The first user may then check profiles of all of the second users to find a suitable second user that suits best to first user's needs corresponding to the posted activity, service or product. For example, if the number of second users who accepted the posted activity/service for sharing/exchanging is more than the required number of second users for performing the posted activity/service, then the first user may be facilitated to approve (select) at least one of the second users who accepted the post. Accordingly, the system may notify the one or more second users (who accepted the posted service or activity) whether they have been approved/selected (to perform the activity or service) by the first user or not. Furthermore, in an embodiment, the system may also provide the approved second users with an additional information or conditions (corresponding to the post) that may be required or helpful in performing (by sharing/exchanging) the activity, service or product. Accordingly, the second users may then perform and complete the required activity or service.

At step 710 (as shown in FIG. 7B), the performance or work done by the second user may be analyzed by the first user based on his/her expectations or requirements for the activity/service to be completed. Further, based on experience of the first user in sharing/exchanging activity/service/product with the second user, the first user may provide ratings or reviews to the profile of the second user. The system may use the ratings as additional information in determining credibility of the second user. Similarly, the second user may also provide rating to the first user based on his/her experience in sharing/exchanging the activity, service or product with the first user.

Further, at step 712, after providing the ratings, the system may calculate credit points for the first user for sharing/exchanging the activity with the second user. Similarly, the credit points may be calculated for the second user that may be given to the second user for successful completion of the accepted activity/service (as posted by the first user). For example, if the service, such as 'vehicle sharing' posted by the first user is accepted to be shared by a second user, then '+5' credit points may be provided to the first user for sharing his/her vehicle with the second user and '−5' credit points may be assigned to the second user for sharing the vehicle of the first user. In an embodiment, the system may utilize some pre-set algorithms in determining the credit points for the first user and the second user(s). For example, the credit points may be calculated based on the type and duration of the activity. Further, in another embodiment, the credit points may be pre-set (by the system) for sharing/exchanging a particular activity. Furthermore, in yet another embodiment, the credit points may be set between the first users and the second users before sharing/exchanging the activity/service or product corresponding to the post (as accepted by the second user).

At step 714, the first user (who receives a credit point for sharing the service with the second user) may be enabled to utilize the credit points for sharing or exchanging at least one of sharable/exchangeable activity, services or product announced by other users of the system. Similarly, each user of the system may utilize his/her overall profile points (as explained earlier in conjunction with FIG. 4). For example, the second user may use the credited points to share/exchange any service/activity/product or to borrow any item, for some days, from other users of the system. It may be appreciated by a person skilled in the art that a user may utilize the points at any time for sharing/exchanging/purchasing at least one of services, products or activities with other users of the system.

In an exemplary embodiment of the invention, the first user may invite one or more second users (of the system) to share a service provided by the first user. After sharing the service, the system may remind the second users to rate the first user based on the quality of service provided by the first user. Further, the system may remind the first user of the system to rate the second users based on his/her experience in sharing the service with the second users. Further, based on the rating provided by the second users, the system may credit points to the first user. For example, if a first user of the system announces that he goes to drop his kid to XYZ School from location ABC daily in the morning at 8 am and he can carry at least three more kids from the way to the same school daily. Then all of the second users who show interest in receiving the service (from the first user) of dropping the kids to the school may accept the announced service.

Further, the second users may rate the first user based on the service provided by the first user. Accordingly, the system may provide credit points to the first user for the service he provided to the second users. The points to be credited to the first user may be calculated based on number of kids served by the first user or based on the number of days for which the service was provided. In an embodiment, the points to be credited to the first user may depend upon the ratings or reviews provided by the second users of the system. In another embodiment, the points to be credited to the first user may be pre-set by the first user and the second users.

In another embodiment of the invention, the user may be facilitated to exchange services with one or more second users (hereinafter referred to as 'service exchange option'). The service exchange option allows a user of the system to provide a service to another user of the system in exchange of any other service that may be provided by the other user. For example, a first user of the system may provide a service to the second user (as a part of the service exchange option) and expect another service from the second user that may or may not be equivalent to the service provided by the first user. For example, if a first user of the system has announced (posted) an exchange service of pet sitting on a certain date as a part of service exchange option, and if a second user accepts (or showed interest in) allowing the first user to take care of his dog on the specified date, then the second user may be liable to return the favour of the service by providing same or some other service to the first user.

Additionally, the first user may specify a required type of service in exchange of pet's sitting initially (with the announcement) as a condition. A second user who accepts the service exchange option may then be obliged to follow the condition of the first user. If the second user of the system negates to full fill the condition of the first user after enjoying the service of the first user then the system may allow the first user to negatively rate the second user or may take any pre-set actions against the second user. Further, the system may deduct some points of the second user and may also compensate the first user by suitable means. In case of successful completion of services by both the first and the second user, the system may facilitate both the users to rate each other. Accordingly, both the first user and the second user may receive some credit points that may or may not be equal. The points may depend upon the ratings or reviews provided by the users to each other or may also depend on the type of service provided or may depend on the amount of time for which the service was provided.

In yet another embodiment of the invention, the first user may announce sharing of a personal item or product with other users of the system. For example, a first user of the system may announce a need of a guitar for one week. A second user having a guitar may accept to share his guitar (with the first user) for one week by specifying condition on sharing the guitar that the first user will have to pay for any damages to the guitar. In another similar example, the second user may accept to share his guitar if first user agrees to transfer certain points to the second user. Again similarly, the second user may accept to share his guitar if the first user agrees to share his violin or any other article with the second user for the same time interval. If the first and second user agrees to each other's conditions then the system may notify both users about their agreement including time, location, compensation, security collateral or any other corresponding condition.

For example, the system may notify both the users about the accepted activity of guitar sharing, related information and corresponding conditions. Further for example, notification may include information such as type of the activity i.e. personal item sharing, time of the process i.e. one week, location such as the address of the first user or second user or both, compensation such as to pay for any damages to guitar, security collateral to submit (by the first user) any article as collateral for guitar, required skill such as the age of the first user to be able to handle the guitar. After the completion of the time period of sharing the personal item (i.e. guitar), the system may send a reminder through suitable means, like profile notification, email or SMS and the like, to both users to provide ratings to each user. In addition, the system may also provide both the users with an option to extend the time period for the activity. Further, the system may send a notification to both the users about any debit or credit of points after completion of the activity.

FIG. 8 illustrates a flow diagram of a method for sharing and exchanging at least one of activity, service and product in a network, in accordance with another embodiment of the present invention. The method may be understood more clearly when, the description corresponding to the method, is read in conjunction with FIGS. 3, 4, 5 and 6. The order in which the method is performed is not intended to be construed as limitation, and further any number of the method steps may be combined in order to implement the method or an alternative method without departing from the scope of the invention.

In FIG. 8, at step 802, a user may register with a system, such as the system 108, to create and account (profile) on the system. The user may submit his/her information to register with the system. The information may include, but is not restricted to, personal information, professional information, educational information and the like. Each registered user (member of the system) may access profiles corresponding to other users of the system.

At step 804, a user (hereinafter referred to as the 'second user') may search (through the profiles of other users within the system) for posted/announced/requested (available) activities, services or products. The available activities, services or products may be announced or requested by other users of the system (hereinafter referred to as first users). For example, the second user may search for any recreational activity, with some credible people, on weekend. The second user may be facilitated to search for activities, in various ways such as based on the type of activity (for example, recreational activity), that may be posted by one or more first users. Further, the second user may search for all kinds of announcement or requests for activities or services or products by a specific first user or a specific group of users. The group may correspond to one of family, friend, business group and the like.

At step 806, the second user may accept the announcement or request including all the terms or conditions made by the first user. The first user may then be notified by the system through suitable means about the acceptance of his/her announcement or request by the second user. The first user may then allow or deny the second user for performing or participating in the activity, service or product that he/she has announced or requested. In an embodiment, the second user may be assigned with the service/activity corresponding to the announcement for completion thereof Further, at step 808, it is determined if the bidding is required for performing/accepting the announcement for sharing/purchasing any activity/service/product posted by the first user. If it is determined that the first user has asked for bid for accepting the request or sharing/exchanging/purchasing the service with/from the first user then the method proceeds to step 810 (as shown by 'Yes' pointer from step 808). Further, if it is determined that no bidding is required for accepting the request or sharing/exchanging/purchasing the service with/from the first user then the method proceeds to step 806 to accept the announcement or request (as shown by 'No' pointer from step 808).

At step 810, the second user may bid to perform or participate in announced activity/service/product. Further, based on the bid, the second user may or may not be allowed by the first user to perform or participate in the activity, service or product announced by the first user. In an embodiment, the second user may also negotiate on the terms and conditions asked by the first user of the system. Further, on completion of the accepted activity/service/request, at step 812, both the first user and the second user may be notified about the completion of the activity, service or product and further about requirement of providing rating to each other based on experience of the first user and performance of the second user.

At step 814, based on the rating/review received from the first user, some points may be debited from the overall profile points of the second user. The system may also notify the second user about the debited points through suitable means such as email notification, profile notification, SMS notification, call notification and the like FIG. 9 illustrates a flow diagram of a method for sharing and exchanging at least one of activity, service and product in a network, in accordance with yet another embodiment of the present invention. The method may be understood more clearly when, the description corresponding to the method, is read in conjunction with FIGS. 7 and 8. The order in which the method is performed is not intended to be construed as limitation, and further any number of the method steps may be combined in order to implement the method or an alternative method without departing from the scope of the invention.

In FIG. 9, at step 902, a profile may be created for a user by receiving information such as personal information, professional information, educational information and the like. The profile of the user may allow him/her to access profiles (information) corresponding to the other users of a system, such as the system 108. At step 904, the user (hereinafter referred to as the 'first user') may be enabled to announce any shareable or exchangeable activity, service or resources for other users of the system. The system may also allow the first user to add conditions (corresponding to the announcement) that may be followed by a second user for performing or participating in the shareable or exchangeable activity, service or resources.

At step 906, based on the announcement or request made by the first user, one or more second users (of the system) may be determined based on the one or more conditions. Further, the determined second users may be the matched suitably for the announced service/activity/product. The one or more second users may be determined by analyzing the profiles of the second users based on the conditions and type of the activity/service/product. Further, hobbies of the second users may be matched with the hobbies of the first user. Furthermore, the location of the activity/service as may be mentioned in announcement may be matched with the location of each second user. Based on the matching of the profile of the second users with the profile of the first user and information corresponding to the activity/service, one or more suitable second users may be determined that may be recommended to the first user.

At step 908, the first user may be notified about the determined profiles of the one or more second users that may be of interest to the first user. Further, at step 910, the second users (of the system) may be enabled to apply or accept the announcement or request for sharable or exchangeable activity, service or resources. In an embodiment, if a second user applies for (or accepts) the announcement or the request then the first user may be notified about the interest of the second user. Further, the second user may be facilitated to perform and complete the accepted activity, service or product. At step 912, after the completion of the task (corresponding to sharable/exchangeable activity, service, product) announced by the first user, both the first user and the second users may be notified through suitable means about rating each other based on their performance or participation in the sharable or exchangeable activity or service or resources. For example, the system may remind the first user to rate all of the second users based on their performances in sharing/exchanging activity, service, product. Further, the system may remind all of the second users to rate the first user depending upon the experience in sharing or exchanging activity, service or resources.

At step 914, depending upon the rating, type, of the announced or requested sharable or exchangeable, activity, service or resources, value of the points may be updated for the particular activity and thus, for the overall profile points. In an embodiment, some points may be credited or debited to/from the first user's account and the second users' account respectively. For example, the system may either credit some points the first user for providing his services or resources to second users or may provide some credit points to the second users for providing their services or resources to first user. In another embodiment, the system may credit some points to both the first user and the second user in case of service exchange option. Yet in another embodiment, the system may calculate the points that may be credited/debited to/from the account of the users based on pre-set algorithms. For example, the credit points may be calculated based on the type of the announced or requested sharable or exchangeable activity, service or resource.

Further, the method is not restricted to above information as mentioned herein. The various embodiments that are explained in FIGS. 3, 4, 5, 6, 7 and 8 may be utilized by each of the methods as explained here above. Further, the invention is not limited to above-mentioned embodiments and examples and many other embodiments and examples may be implemented in light of the invention without departing from the scope of the invention.

It may be appreciated by the person skilled in the art that the present invention is not limited to the above-mentioned embodiments. Further, various other embodiments may also be implemented through the features provided by the system. Also, the usage of terminology such as 'first user', 'second user' may not be considered as restrictive aspect of the present invention as such terminologies are used just for the purpose of better explanation. Furthermore, a user of the system, such as the system 108 (as described previously), not only be facilitated to share or exchange resources and information in the network. Additionally, the user may be supported perform various other tasks such as selling, purchasing, borrowing one or more items, service, activities, information and so forth.

Advantageously, the present invention provides a method and system to support sharing/exchanging/purchasing/selling any activity/service/product with one or more users. Further, the present invention allows each user to share/exchange resources/information with users having some credibility value. Furthermore, the present invention facilitates the user to determine the credibility of other users before sharing/exchanging/purchasing/selling any activity/service/product therewith. Again further, the present invention enables each user to announce any activity/service/product that may be assigned to other credible users of the system. Moreover, the present invention may provide suitable matches, of one or more credible users, for performing/sharing any activity/service/product provide rating provides. This saves time consumption at the user's end that may otherwise be consumed in searching credible and suitable persons. Additionally, the present invention may enable the users to receive credit points for sharing/exchanging activities/services/product. Thus, this enables each user to do trade activities, through credit points, without spending time through personal involvement in discussing the corresponding matters. Accordingly, the users may receive benefit of social networking while earning the points.

It may be appreciated by a person skilled in the art that the invention is not limited to the advantages as mentioned here above. Further many other advantages may be understood in light of the description given above without departing from the scope of the invention. For example, in an embodiment, the user may be facilitated to receive notifications when one or more activities/services are accepted by any user of the system. Due to this, the user who posts any activity/service need not check time and again for determining whether any response is received from any suitable user.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions that execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, mini-computers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for sharing and exchanging in a network, the system comprising:
   (a) a processor;
   (b) a memory coupled to the processor, the memory comprising:
      (1) a database comprising:
         (i) information corresponding to first users, each of the first users being facilitated for announcing sharable activity, service or product, and one or more conditions corresponding thereto, the sharable activity, service or product being announced for inviting one or more second users there for;
         (ii) information corresponding to the one or more second users, the second users being facilitated for accepting at least one of the announced sharable activity, service or product;
      (2) instructions executable by the processor to match each of the first users to at least one of the second users; and
      (3) instructions executable by the processor to inform each of the first users about the match with the at least one of the second users, wherein each of the first users matches with at least one of the second users when all the one or more conditions are met by the at least one second user based on the information corresponding to each of the second users;
      (4) instructions, executable by the processor, to send a notification for crediting at least one first user and debiting at least one second user with pre-set number of points, based on sharing at least one of activity, service or product between the at least one first user and the at least one second user, wherein the credited points being utilized, by the first user, for one of share or exchange of at least one of sharable activity, service or product announced by one or more other first users;
      (5) instructions, executable by the processor, for receiving rating from at least one of the first users or at least one of the second users from at least one of the second users or the at least one of the first user respectively, based on the accepted at least one of sharable activity, service or product.

2. The system according to claim 1, wherein one of the sharable activity, service or product comprise share of one of ride in said first user vehicle, sport activity or share of a personal item.

3. The system according to claim 1, wherein the at least one of the announced sharable activity, service or product being accepted to share the at least one of the announced sharable activity, service or product from the first users, the at least one of the announced sharable activity, service or product being accepted based on the one or more conditions.

4. The system according to claim 1, wherein the one or more conditions comprise at least one of type, time, location, compensation, security collateral or required skill level corresponding to the sharable activity, service or product.

5. The system of claim 1, wherein the memory further comprising instructions, executable by the processor, to send a reminder to the at least one of the first users and at least one of the second users for providing rating to the at least one of the second users and the at least one of the first user respectively, based on the accepted at least one of sharable activity, service or product.

6. A system to support sharing and exchanging in a network, the system comprising:
   (a) a processor;
   (b) a memory coupled to the processor, the memory comprising:
      (1) a database comprising:
         (i) List of first users, each of the first users willing to provide share of at least one of activity, service or product, and one or more conditions corresponding thereto;
         (ii) List of second users, the second users facilitated to accept the share of activity, service or product; and
      (2) instructions executable by the processor to match each of the first users to at least one of the second users, wherein each of the first users matches with at least one of the second users when the one or more conditions are met by information corresponding to the at least one of the second users;
      (3) instructions executable by the processor to send an email to the first user for credit of pre-set number of points; and
      (4) instructions executable by the processor to send an email to the at least one of the second users for debit of the pre-set number of points; wherein the pre-set number of points being credited and debited based on sharing at least one of activity, service or product with the at least one of the second users; wherein the memory further comprising instructions executable by the processor to enable the first user to utilize the credited points for one of share or exchange of at least one of sharable activity, service or product announced by one or more other users;

(5) instructions, executable by the processor, for receiving rating from at least one of the first users or at least one of the second users from at least one of the second users or the at least one of the first user respectively, based on the accepted at least one of sharable activity, service or product.

7. The system of claim 6, wherein the memory further comprising instructions executable by the processor to inform each of the first users about the match with the at least one of the second users.

8. The system according to claim 6, wherein said share of at least one of activity, service or product comprises one of share of ride in vehicle corresponding to the first user, share of one of sport activity or a personal item.

9. The system of claim 6, wherein each of the first users willing to offer exchange of at least one of the service or the product, the second users facilitated to accept the exchange of the at least one of the service or the product.

10. The system according to claim 6, wherein the one or more conditions comprise at least one of type, time, location, compensation, security collateral and required skill level corresponding to the at least one of activity, service or product.

11. A system to support sharing and exchanging in a network, the system comprising:
(a) a processor;
(b) a memory coupled to the processor, the memory comprising:
(1) a database comprising:
(i) List of first users, each of the first users willing to provide share of at least one of activity, service or product, and one or more conditions corresponding thereto;
(ii) List of second users, the second users facilitated to accept the share of activity, service or product; and
(2) instructions executable by the processor to match each of the first users to at least one of the second users, wherein each of the first users matches with at least one of the second users when the one or more conditions are met by information corresponding to the at least one of the second users; and
(3) instructions executable by the processor for sending notification to the first user and the at least one second user for corresponding credit and debit of pre-set number of points based on sharing of the activity, the service or the product, the pre-set number of points being credit or debited based on accepting the announced sharable activity, service or product; wherein the memory further comprising instructions executable by the processor to enable the first user to utilize the credited points for one of share or exchange of at least one of sharable activity, service or product announced by one or more other users;
(4) instructions executable by the processor for receiving rating from at least one of the first users or at least one of the second users from at least one of the second users or the at least one of the first user respectively, based on the accepted at least one of sharable activity, service or product;
(5) instructions executable by the processor to send a notification to the first user to provide review for the at least one of the second user; and
(6) instructions executable by the processor to send a notification to the at least one of the second users to provide review for the at least one of the first user.

12. The system according to claim 11, wherein of the one or more conditions comprise at least one of type, date, time, maximum time window, maximum time window, location, compensation, security collateral, and required skill level corresponding to the share of activity, service or product.

* * * * *